(12) United States Patent
Hino et al.

(10) Patent No.: US 7,550,894 B2
(45) Date of Patent: Jun. 23, 2009

(54) ROTARY ELECTRICAL MACHINE

(75) Inventors: Haruyoshi Hino, Shizuoka (JP); Keiko Murota, Shizuoka (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 490 days.

(21) Appl. No.: 11/298,979

(22) Filed: Dec. 9, 2005

(65) Prior Publication Data

US 2006/0152104 A1 Jul. 13, 2006

(30) Foreign Application Priority Data

Dec. 9, 2004 (JP) .............................. 2004-357339
Apr. 28, 2005 (JP) .............................. 2005-133559

(51) Int. Cl.
H02K 1/22 (2006.01)
(52) U.S. Cl. ...................................... 310/268; 310/191
(58) Field of Classification Search ................. 310/191, 310/268, 254
See application file for complete search history.

(56) References Cited

U.S. PATENT DOCUMENTS

| | | | |
|---|---|---|---|
| 2,453,523 A | 11/1948 | McCullough | |
| 3,566,165 A | 2/1971 | Lohr | |
| 4,110,649 A | * 8/1978 | Mas | ........................... 310/191 |
| 4,132,281 A | 1/1979 | Gaddi | |
| 4,536,668 A | 8/1985 | Boyer | |
| 4,829,208 A | 5/1989 | Uchino | |

(Continued)

FOREIGN PATENT DOCUMENTS

DE          411 877 C       4/1925

(Continued)

OTHER PUBLICATIONS

Search Report for PCT Patent Application No. PCT/JP2004/007603, mailed Aug. 24, 2004.

(Continued)

*Primary Examiner*—Nguyen N Hanh
(74) *Attorney, Agent, or Firm*—Knobbe, Martens, Olson & Bear, LLP

(57) ABSTRACT

A rotary electrical machine has a mechanism capable of varying an output characteristic, without increasing mechanical loss, or without consuming the electric power that does not contribute to increasing torque. The rotary electrical machine has a rotor with N pole and S pole magnets alternately and fixedly disposed thereon. An end surface, (which opposes the rotor), of each of a plurality of first teeth positioned on a first stator section is broader than that of the opposite surface thereof, and a winding is wound around a portion between both of the end surfaces. A second stator section has second teeth, corresponding the number of the first teeth, and which has no winding. The second teeth are disposed to oppose the end surfaces of the respective first teeth, and each second tooth is reciprocally movable between a reference position at which the second tooth directly opposes the respective first tooth and a maximum movable position located at the right center position between the respective end surfaces. At the reference position, a strong magnetic flux flows into the entire first tooth from each magnet. At the maximum movable position, a weak magnetic flux flows over the end surface of each first tooth. A middle amount of the magnetic flux flow occurs at a middle moved position.

19 Claims, 24 Drawing Sheets

U.S. PATENT DOCUMENTS

| | | | |
|---|---|---|---|
| 4,877,987 | A | 10/1989 | Flaig et al. |
| 5,014,800 | A | 5/1991 | Kawamoto et al. |
| 5,036,213 | A | 7/1991 | Isozumi |
| 5,087,229 | A | 2/1992 | Hewko et al. |
| 5,144,183 | A | 9/1992 | Farrenkopf |
| 5,272,938 | A | 12/1993 | Hsu et al. |
| 5,294,853 | A | 3/1994 | Schluter et al. |
| 5,304,878 | A | 4/1994 | Oda et al. |
| 5,442,250 | A | 8/1995 | Stridsberg |
| 5,505,277 | A | 4/1996 | Suganuma et al. |
| 5,570,752 | A | 11/1996 | Takata |
| 5,581,136 | A | 12/1996 | Li |
| 5,691,584 | A | 11/1997 | Toida et al. |
| 5,755,304 | A | 5/1998 | Trigg et al. |
| 5,818,134 | A | 10/1998 | Yang et al. |
| 5,826,675 | A | 10/1998 | Yamamoto |
| 5,834,874 | A | 11/1998 | Krueger et al. |
| 5,915,493 | A | 6/1999 | Nakayama |
| 5,960,901 | A | 10/1999 | Hanagan |
| 6,046,518 | A | 4/2000 | Williams |
| 6,121,711 | A | 9/2000 | Nakahara et al. |
| 6,199,652 | B1 | 3/2001 | Mastroianni et al. |
| 6,321,863 | B1 | 11/2001 | Vanjani |
| 6,590,306 | B2 | 7/2003 | Terada |
| 6,765,327 | B2 | 7/2004 | Hashimoto et al. |
| 7,342,342 | B2 | 3/2008 | Naitou et al. |
| 7,385,332 | B2 * | 6/2008 | Himmelmann et al. ...... 310/190 |
| 2001/0010439 | A1 | 8/2001 | Klinger et al. |
| 2003/0221887 | A1 | 12/2003 | Hsu |

FOREIGN PATENT DOCUMENTS

| | | |
|---|---|---|
| EP | 0 980 821 A2 | 2/2000 |
| EP | 1 220 427 A2 | 7/2002 |
| EP | 1 270 395 A3 | 3/2005 |
| FR | 1 534 007 A | 7/1968 |
| JP | 54-103509 | 7/1979 |
| JP | 60-34767 | 3/1985 |
| JP | 02-37027 | 5/1989 |
| JP | 03-215154 | 9/1991 |
| JP | 04-185207 A | 7/1992 |
| JP | 43-10683 A | 11/1992 |
| JP | 05-300712 | 11/1993 |
| JP | 11-034965 | 2/1999 |
| JP | 11-122886 | 4/1999 |
| JP | 2000-261988 | 9/2000 |
| JP | 2001-298901 | 10/2001 |
| JP | 2002-247822 | 8/2002 |
| JP | 2002-325412 | 8/2002 |
| JP | 2002-325412 | 11/2002 |
| JP | 2003-191883 | 7/2003 |
| JP | 2004-166369 A | 6/2004 |
| JP | 2006-191782 * | 7/2006 |

OTHER PUBLICATIONS

Co-Pending U.S. Appl. No. 11/335,868, filed Jan. 18, 2006 in the name of Shinya Naitou et al.

Co-Pending U.S. Appl. No. 11/971,089, filed Jan. 8, 2008 in the name of Shinya Naitou, et al.

Office Action received Jun. 3, 2008 in U.S. Appl. No. 11/971,089.

Search Report for European Patent Application No. EP 05 02 6632, mailed Mar. 31, 2006 (18 pages).

* cited by examiner (a)

(b)

(a)

(b)

(a)

(b)

(c)

(d)

ROTARY ELECTRICAL MACHINE

CROSS-REFERENCE TO RELATED APPLICATIONS

The present application is based on and claims priority under 35 U.S.C. § 119 to Japanese Patent Application No. 2004-357339, filed on Dec. 9, 2004; and Japanese Patent Application No. 2005-133559, filed Apr. 28, 2005, the entire contents of which is expressly incorporated by reference herein.

BACKGROUND OF THE INVENTION

1. Field of the Invention

The present invention relates to a small rotary electrical machine in which a current flowing through a coil is not used for a field magnet weakening control. An extensive operation range covering a high torque low speed rotation through a low torque high speed rotation is thus provided, and a control thereof is easily done with high efficiency.

2. Description of the Related Art

Conventionally, radial gap type electric motors, such as a radial gap type rotary electrical machine, are used as a drive source for electromotive two-wheeled vehicles or the like. Such radial gap type electric motors, and other general electric motors, have a structure in which a yoke of a rotor (rotor side yoke) and a yoke of a stator (stator side yoke) oppose each other, and in which their opposing surfaces extend parallel to an axis of a rotating shaft supported by bearings.

The opposing surface of the rotor side yoke has a plurality of field magnets circumferentially disposed on a cylindrical inner wall, while the opposing surface of the stator side yoke has a plurality of teeth radially disposed thereon so as to oppose the surface of the rotor side yoke. A coil is wound around each one of the plurality of teeth. That is, in the radial gap type electric motor, the opposing surfaces of the field magnets and the teeth extend about axes transverse to the axis of the rotating shaft, and the opposing surfaces define an annular gap therebetween about the rotating shaft. That is, the gap in the radial gap type electric motor is defined in a direction generally transverse to the axis of rotation.

In contrast, although being a kind of the radial gap type electric motor, there is another electric motor that has a configuration in which the stator side yoke is cylindrically formed, and the rotor side yoke is columnar and positionable within the cylinder. One such type of electric motor is proposed, for example, in Japanese Publication No. JP 2000-261988. Such an electric motor has a cylindrical member in which a permeable section and an impermeable section are alternately positioned between opposing surfaces of ends of respective projections of a stator core of the stator core side yoke and opposing surfaces of respective permanent magnets of the rotor side yoke to prevent cogging from occurring and also to bring in a low torque operation in a high speed rotation.

Another electric motor in which the stator side yoke is cylindrically formed and the rotor side yoke is columnar to be positioned within the cylinder, is proposed, for example, in Japanese Publication No. JP 2004-166369. In order to reduce the stator flux linkage in the high speed rotation, the stator core of the stator side yoke is constructed with a cylindrical core extending about an axis of rotation and a bar-like core reciprocating within the cylindrically shaped core in a direction generally transverse to the axis of rotation. The bar-like shaped core moves in the transverse direction of the stator core relative to a coil that is circumferentially wound around the cylindrically shaped core.

Recently, in addition to the radial gap type rotary electrical machines, axial gap type rotary electrical machines have attracted a great deal of attention. For example, an axial gap type electric motor, as one of the axial gap type rotary electrical machines, has a disk-like rotor side yoke including a rotational shaft supported by its bearings and a disk-like stator side yoke with a center aligned with an axis of the rotational shaft. The disk-like rotor side yoke and disk-like stator side yoke are disposed opposite each other.

On a surface of the rotor side yoke, a plurality of field magnets are circularly (or annularly) disposed along a disk-like circumferential portion thereof. Likewise, a plurality of teeth is disposed along a disk-like circumferential portion of a surface of the stator side yoke. The surface of the rotor-side yoke and the surface of the stator-side yoke are disposed opposite each other. Also, the opposing surfaces of the field magnets and of the teeth define a gap therebetween, and the opposing surfaces define a surface that crosses the rotational shaft at right angles (i.e., perpendicularly crosses the rotational shaft). That is, the gap is formed to extend in a direction along the rotational shaft, i.e., axially.

One method to vary an output characteristic of an axial gap type electric motor, as thus described, includes moving either a rotor (the rotor side yoke having field magnets) or a stator disposed to oppose to the rotor (a coiled core positioned on the stator side yoke) in a direction of the rotational shaft to control a distance between the rotor and the stator. Therefore, an amount of magnetic flux flowing between the field magnets and the coiled core is controlled. However, though conventional gap type electric motors can vary the output characteristic by increasing the gap between the rotor and the stator, they necessarily require that the electric motor units be bulkier to allow for said variation in gap size. Such increased bulkiness is contrary to the desire to have gap type electric motors (both axial gap type and radial gap type) be as small as possible.

SUMMARY OF THE INVENTION

In view of the circumstances, an aspect of the present invention is to provide a rotary electrical machine in which a stator disposed opposite to a rotor is divided into at least two portions. One portion is fixed and another portion is movable in a rotational direction of the rotor relative to the fixed portion to greatly change flow of flux, i.e., a base portion of the stator is rotational (movable) to control the field.

In accordance with one aspect of the present invention, a rotary electrical machine comprises a rotor rotational about an axis of a rotating shaft and a stator disposed so as to oppose to the rotor. One of the rotor and the stator is divided into at least two portions in the axial direction. One such portion is movable in a rotational direction or a reverse rotational direction of the rotor relative to another such portion in such a manner that a gap to form a magnetic resistance between the first portion and the second portion is variable.

This rotary electrical machine is constructed, for example, such that the movement of the one portion relative to another portion is a reciprocal movement within a predetermined angle.

The rotary electrical machine can be constructed, for example, to comprise a rotor and a stator, the stator having a first portion and a second portion. The first portion is a first stator core having a first set of teeth. The first set of teeth has first end surfaces that oppose the rotor, and a winding is wound around a circumferential side surface of each one of the first set of teeth. The second portion of the stator is a second stator core having a second set of teeth. Each tooth of the second set of teeth has an end portion positioned to oppose second end surfaces of the first set of teeth, the second end surfaces facing in an opposite direction from the first end surfaces that oppose to the rotor.

The rotary electrical machine is constructed, for example, in such a manner that a rotational angle of the second portion of the stator, relative to the first portion of the stator, is less than a pitch angle defined by two adjacent teeth of the second set of teeth.

In another mode, the rotary electrical machine can be constructed, for example, to comprises a rotor and a stator, the rotor having a first portion and a second portion. The first portion of the rotor is a first rotor section having a first set of magnetic members, each of the first set of magnetic member having a first end surface disposed opposite the stator. The second portion of the rotor is a second rotor section having a second set of magnetic members. Each magnetic member of the second set of magnetic members have an end portion positioned opposite to second end surfaces of the first set of magnetic members the second end surfaces facing in an opposite direction from the first end surfaces.

The rotary electrical machine is constructed, for example, in such a manner that a rotational angle of the second portion of the rotor, relative to the first portion of the rotor, is less than a pitch angle defined by two adjacent magnetic members of the second set of magnetic members.

In accordance with another aspect of the present invention, a rotary electrical machine comprises a rotor having an annular section that rotates about an axis of a rotating shaft and a first stator core having a first set of teeth. Each tooth of the first set of teeth has a portion with an end surface positioned opposite to the annular section. A winding is wound around a side circumferential surface of the portion, except for both end surfaces thereof. A second stator core has a second set of teeth. Each tooth of the second set of teeth has an end portion positioned to oppose second end surfaces of the first teeth, the second end surfaces facing in an opposite direction to the end surfaces of the first teeth. The second stator core is movable in at least a rotational direction or a reverse rotational direction of the rotor.

The second stator core is constructed, for example, to be movable in the rotational direction or the reverse rotational direction of the rotor and also movable in an axial direction relative to the rotor.

Also, each tooth of the first set of teeth is constructed, for example, to have a projection abutting on a side surface of each tooth of the second set of teeth. The projection extends from the second end surfaces of each tooth of the first set of teeth and opposite the end portions of the second set of teeth.

In another mode, rotary electrical machine is constructed in such a manner that each tooth of the first set of teeth is divided into a first portion and a second portion. The first portion has a winding on a circumferential surface thereof and the second portion has no winding on a circumferential surface thereof. The second set of teeth include teeth corresponding to the first portion of each tooth of the first set of teeth, as well as other teeth corresponding to the second portion of each tooth of the first set of teeth.

In another mode, respective opposing surfaces of the rotor and the first set of teeth can be formed to extend obliquely in such a manner that an inner side of the opposing surface of the rotor that is positioned radially closer to the axis of a rotating shaft has a greater thickness than an outer side of the opposing surface positioned radially farther from the axis.

In accordance with another aspect of the present invention, a rotary electrical machine comprises a cylindrical rotor rotational about an axis of a rotating shaft and a first stator core having a first set of teeth. Each tooth of the first set of teeth has an end surface positioned inside of the cylindrical configuration of the cylindrical rotor and opposite to the rotor. A winding is wound around a circumferential side surface of each tooth of the first set of teeth, except for both end surfaces of the tooth. A second stator core has a second set of teeth. Each tooth of the second set of teeth has an end portion positioned opposite second end surfaces of the first set of teeth. The second end surfaces face in a direction opposite from the end surfaces of the first teeth. The rotary electrical machine is constructed such that the second stator core is movable in a rotational direction or a reverse rotational direction of the rotor, and the first stator core is disposed between the cylindrical rotor and the second stator core.

In accordance with an additional aspect of the invention, a rotary electrical machine comprises a columnar cylindrical rotor rotational about an axis of a rotating shaft. A first stator core has a first set of teeth disposed circumferentially about the rotor, each tooth of the first set of teeth having one end surface opposite the rotor. A winding is wound around a circumferential side surface of each tooth of the first set of teeth, except for both end surfaces of the tooth. A second stator core has a second set of teeth, each tooth of the second set of teeth having one end portion positioned opposite second end surfaces of the first set of teeth that face in a direction opposite to the end surfaces of the first set of teeth. Second end portions of the second set of teeth are retained by a retainer. The rotary electrical machine is constructed such that the second stator core is movable in a rotational direction or a reverse rotational direction of the rotor about the first stator core, and the first stator core is disposed between the rotor and the second stator core.

In a preferred mode, the rotary electrical machine is constructed, for example, in such a manner that, when the second set of teeth are positioned to directly face the first set of teeth, a magnetic resistance existing between a tooth of the first set of teeth and an oppositely facing tooth of the second set of teeth is smaller than a magnetic resistance existing between adjacent teeth of the first set of teeth. When the second set of teeth move so that a tooth of the second set of teeth is positioned between adjacent teeth of the first set of teeth, a magnetic resistance passing through the tooth of the second set of teeth is larger than a magnetic resistance existing between the adjacent teeth of the first set of teeth.

In such manners that the magnetic resistances are adjustable by a distance between adjacent teeth of the first set of teeth, or by a distance between a tooth of the first set of teeth and a tooth of second set of teeth.

In a preferred mode of the invention, the rotary electrical machine is constructed to include a movement drive force transmitting mechanism for moving the second stator core in the rotational direction or the reverse rotational direction of the rotor. In one mode, the rotary electrical machine is constructed such that the movement of the second stator core relative to the first stator core is a reciprocal movement within a predetermined angle in the rotational direction or the reverse rotational direction of the rotor. In another mode, the rotary electrical machine is constructed such that the movement of the second stator core relative to the first stator core is an intermittently rotational movement in the rotational direction of the rotor. In an additional mode, the rotary electrical machine is constructed such that the first set of teeth and the winding are unitarily molded together. In another mode, the rotary electrical machine is constructed such that the second set of teeth and the winding are unitarily molded together.

BRIEF DESCRIPTION OF THE DRAWINGS

These and other features, aspects and advantages of the present invention will now be described in connection with preferred embodiments of the invention, in reference to the accompanying drawings. The illustrated embodiments, however, are merely examples and are not intended to limit the invention. The drawings include the following 24 figures.

DETAILED DESCRIPTION OF THE PREFERRED EMBODIMENT

Definitions

As used herein, a "circumferential" surface or portion is a surface or portion that in cross-section can have a variety of shapes, including, but not limited to, circular, square, rectangular, triangular, and oval.

As used herein, an "axial" direction is defined as being along an axis or parallel to an axis. For example, an electric motor with a rotor that rotates about an axis and a stator spaced apart from the rotor in the axial direction defines an axial gap between the rotor and stator along the axis of rotation.

As used herein, "rotational direction" is defined as a direction about an axis. For example, a rotor that extends about an axis of rotation thereof can rotate in a rotational direction about the axis.

Figure 1:
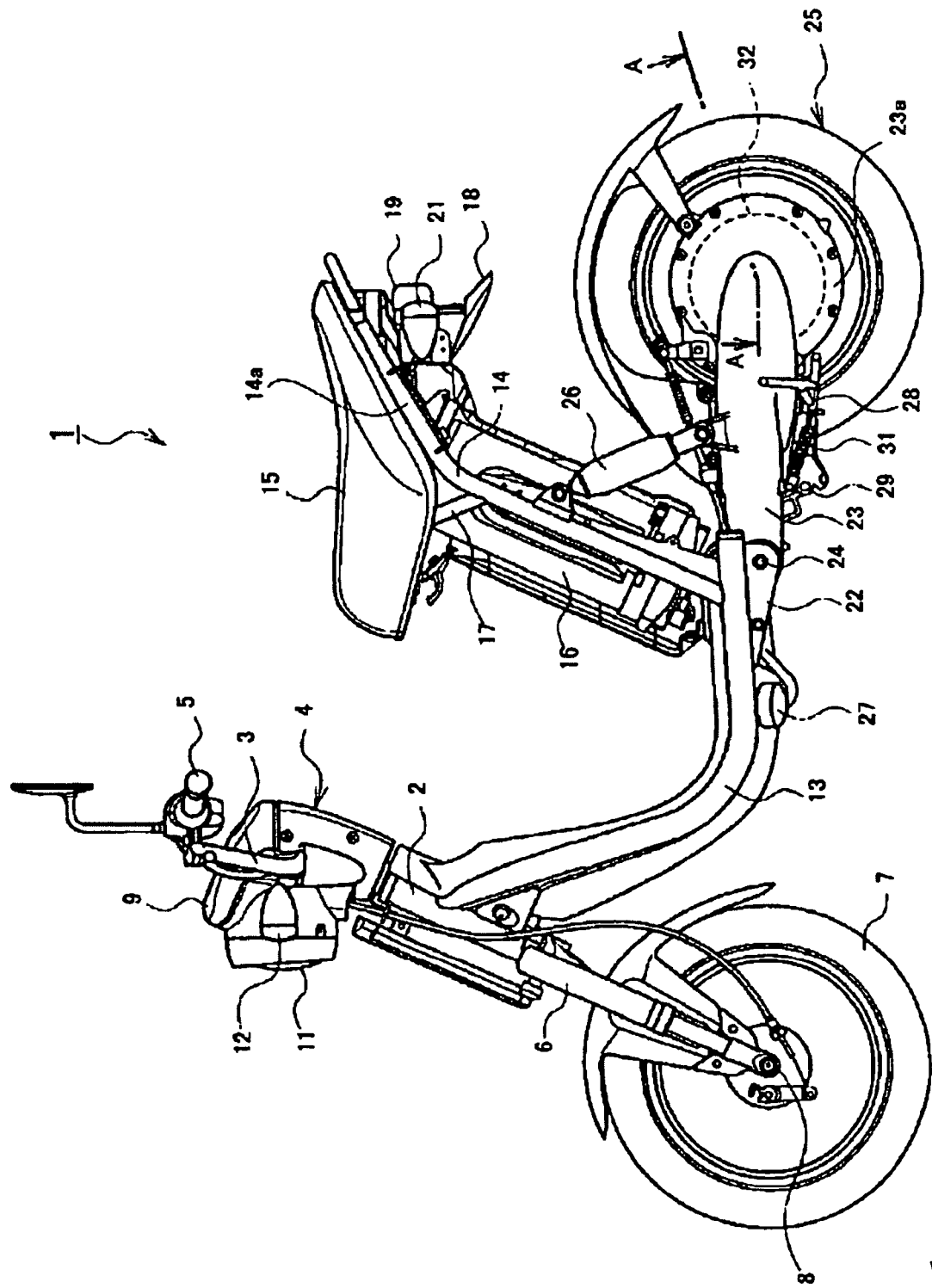
FIG. 1 is a side elevational view of an electromotive two-wheeled vehicle as an example of a device on which an axial gap type rotary electrical machine as a rotary electrical machine according to a first embodiment of the present invention is mounted.

Electromotive Two-Wheeled Vehicle on which a Rotary Electrical Machine is Mounted FIG. 1 is a side elevational view of an electromotive two-wheeled vehicle as an example of a device having an axial gap type rotary electrical machine thereon according to a first embodiment. As shown in FIG. 1, the electromotive two-wheeled vehicle of this embodiment has a head pipe 2 disposed at a forward end of a vehicle body. A steering shaft (not shown) for changing a direction of the vehicle body is inserted into the head pipe 2 for pivotal movement of a front wheel 7.

A handlebar supporting portion 4 to which handlebars 3 are fixed is attached to a top end of this steering shaft, and a grip 5 is attached to each end of the handlebars 3. Also, in FIG. 1, the grip on the right hand side of the handlebars 3, forms a rotational throttle grip.

A front fork 6 having right and left members is coupled with a bottom of the head pipe 2 and extends downward. The members of the front fork 6 have a front axle 8 interposed therebetween in suspended condition for supporting and damping the front wheel 7.

The foregoing handlebar supporting portion 4 has indicators 9 disposed in front of the handlebars 3. A head lamp 11 is fixed on the handlebar supporting portion 4 below the indicators 9. Flasher lamps 12 (one of the flasher lamps 12 positioned on the right hand side) are positioned on both sides of the head lamp 11.

Right and left members of a vehicle body frame 13 are generally L-shaped and extend rearward relative to the vehicle body. Each member of the vehicle body frame 13 is preferably a round pipe that obliquely extends downward and rearward from the head pipe 2 and then extends horizontally and rearward to provide the generally L-shaped configuration of the vehicle body frame members 13.

A pair of right and left seat rails 14 are coupled with respective rear side ends of the members of the vehicle body frames 13 to further obliquely extend rearward and upward from the respective rear side ends of the vehicle body frame members 13. A rear end 14a of each seat rail 14 curves rearward along the same configuration of a seat 15.

A battery 16 is detachably disposed between the right and left seat rails 14. This battery 16 is constructed to incorporate a plurality of second cells which are rechargeable. A seat stay 17 having a reversed U-shape is welded to a portion of the right and left seat rails 14 adjacent to the curved portions of the seat rails 14. The seat stay 17 slants upward forward relative to the vehicle body. The seat 15 is positioned on the seat stay 17 and the pair of the right and left seat rails 14 such that the seat 15 can move between opening and closing positions with the forward end of the seat 15 capable of pivoting vertically.

Also, a rear fender 18 is attached to the rear ends of the seat rails 14, and a tail lamp 19 is attached to a rear surface of the rear fender 18. Further, flasher lamps 21 (one of the flasher lamps 21 positioned on the right hand side are positioned on both sides of the tail lamp 19.

Right and left rear arm brackets 22 (in FIG. 1, only the bracket 22 on the left hand side of the vehicle is shown) are welded to a horizontal portion of each one of the right and left vehicle body frame members 13, which extend below the seat 15. A forward end of a rear arm 23 is supported by the right and left rear arm brackets 22 so as to allow a vertical swing movement of the arm 23 via a pivot shaft 24.

A rear wheel 25, which preferably serves as a drive wheel, is supported for rotation at a center of a generally circularly formed rear end 23a of the rear arm 23. The rear arm 23 and the rear wheel 25 are suspended by a rear shock absorber 26 to dampen vertical movement of the wheel 25.

A pair of right and left footsteps 27 (in FIG. 1, only the footstep 27 on the left hand side of the vehicle is shown) are disposed below the respective horizontal portions of the right and left vehicle body frame members 13. Also, a side stand 28 is supported by the rear arm 23 on the left hand side of the vehicle body via a shaft 29. This side stand 28 is urged by a return spring 31 toward a retracted position.

A drive unit including an axial gap type electric motor 32 that is arranged so as to drive the rear wheel 25 is incorporated within the rear end 23a of the rear arm 23.

Basic Structure of Axial Gap Type Electric Motor

Figure 2:
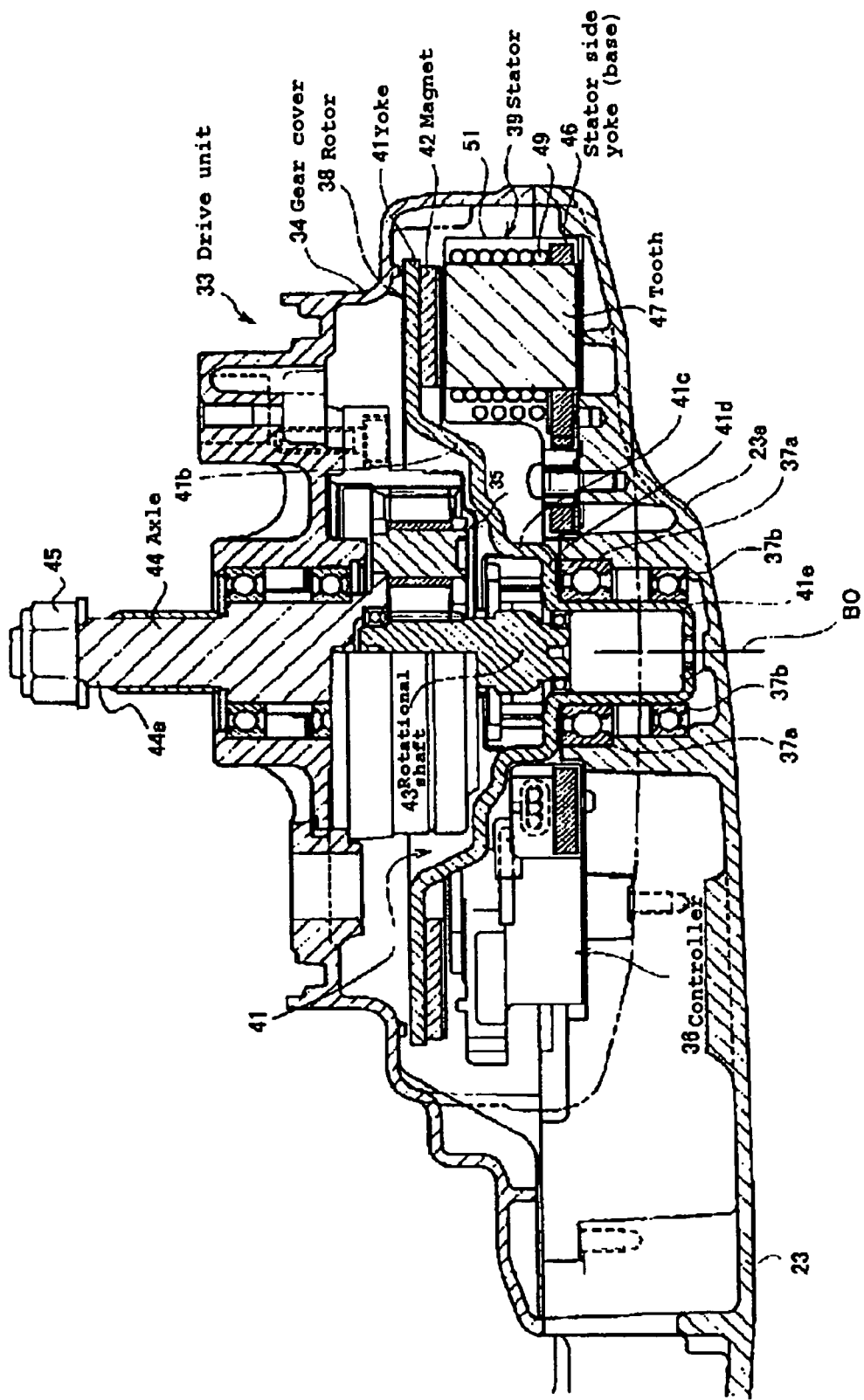
FIG. 2 is a cross-sectional view, showing a structure of the axial gap type electric motor (electric motor) together with a structure around the rear end of a rear arm.

FIG. 2 is a cross-sectional view taken along line A-A of FIG. 1, showing a structure of the axial gap type electric motor (hereunder, simply can be called electric motor), together with a structure around the rear end 23a of the rear arm 23. However, the rear wheel 25 is not shown.

In FIG. 2, a drive unit 33 is incorporated within a space defined inside of a gear cover 34 attached to a right side (in FIG. 2) of the rear end 20a of the rear arm 23. The drive unit 33 includes the electric motor, a planetary geared speed reducer 35, a controller 36 and so forth together unitarily built in.

As shown in FIG. 2, the electric motor includes a rotor 38 supported by bearings 37a, 37b at the rear end 23a of the rear arm 23 for rotation about a center axis BO of the bearings 37a, 37b. The electric motor also includes a generally annular (or doughnut-like shaped) stator 39 fixed to an inside surface of the rear end 23a of the rear arm 23 opposite the rotor 38.

As shown in FIG. 2, the rotor 38 has a rotor side yoke 41 (41a-41e) which has a generally gambrel-like shape convex toward the rear end 23a of the rear arm 23. That is, the rotor side yoke 41 includes an annular section 41a opposite to the stator 39. A tapered section 41b extends generally in a truncated cone shape toward the rear end 23a of the rear arm 23 from an inner circumferential periphery of the annular section 41a. A first cylindrical section 41c coaxially extends along the center axis BO toward the rear end 23a of the rear arm 23 from a terminal end of the tapered section 41b. An annular section 41d extends in a radial direction toward the center axis BO from a terminal end (in FIG. 2, bottom end) of the cylindrical section 41c. A second cylindrical section 41e coaxially extends along the center axis BO toward the rear end 23a of the rear arm 23 from an inner circumferential periphery of the annular section 41d.

The second cylindrical section 41e is supported by the bearings 37a, 37b for rotation about the center axis BO, so as to form a rotational shaft of the rotor 38. Thus, a rotational center of a rotational shaft 43 of the rotor 38 corresponds to the center axis BO of the bearings 37a, 37b.

The rotor 38 also has a plurality of field magnets 42 fixedly positioned on a surface of the annular section 41a of the rotor side yoke 41, said surface facing the stator. These field magnets 42 are located annularly and coaxially about the center axis BO and circumferentially along the annular section 41a. The field magnets 42 are positioned in such a manner that the N pole and the S pole alternate about the circumference of the annular section 41a. Alternatively, the field magnets 42 can be made from a single magnet member having the N pole and the S pole alternately magnetized, both of which are formed with dielectric body portions that are permanently polarized along the same circumferential surface of a disk or ring.

The toothed rotational shaft 43 is fixedly attached to a rear wheel side end of the second cylindrical section 41e of the rotor 38, so as to extend coaxially with the rotor 38 (the second cylindrical section (41e). Thus, the toothed rotational shaft 43 rotates together with the rotor 38.

A planetary gear speed reducer 35 is coupled with the toothed rotational shaft 43 and is disposed in the tapered section 41b of the rotor side yoke 41. The planetary gear speed reducer 35 and the electric motor (the rotor 38 and the stator 39) overlap with each other in a width direction of the vehicle.

The planetary gear speed reducer 35 is coupled with a rear axle 44 which extends coaxially with the toothed rotational shaft 43. The planetary gear speed reducer 35 operates to reduce a speed of rotation of the electric motor (e.g., rotation of the second cylindrical section (41e), as well as to transmit the rotation of the electrical motor to the rear axle 44 through the toothed rotational shaft 43.

A nut 45 is detachably screwed onto a tip 44a of the rear axle 44 that projects from the gear cover 34 for the rear axle 44. The rear wheel 25, shown in FIG. 1, is fixedly attached to the rear axle 44 via the nut 45.

Figure 3:
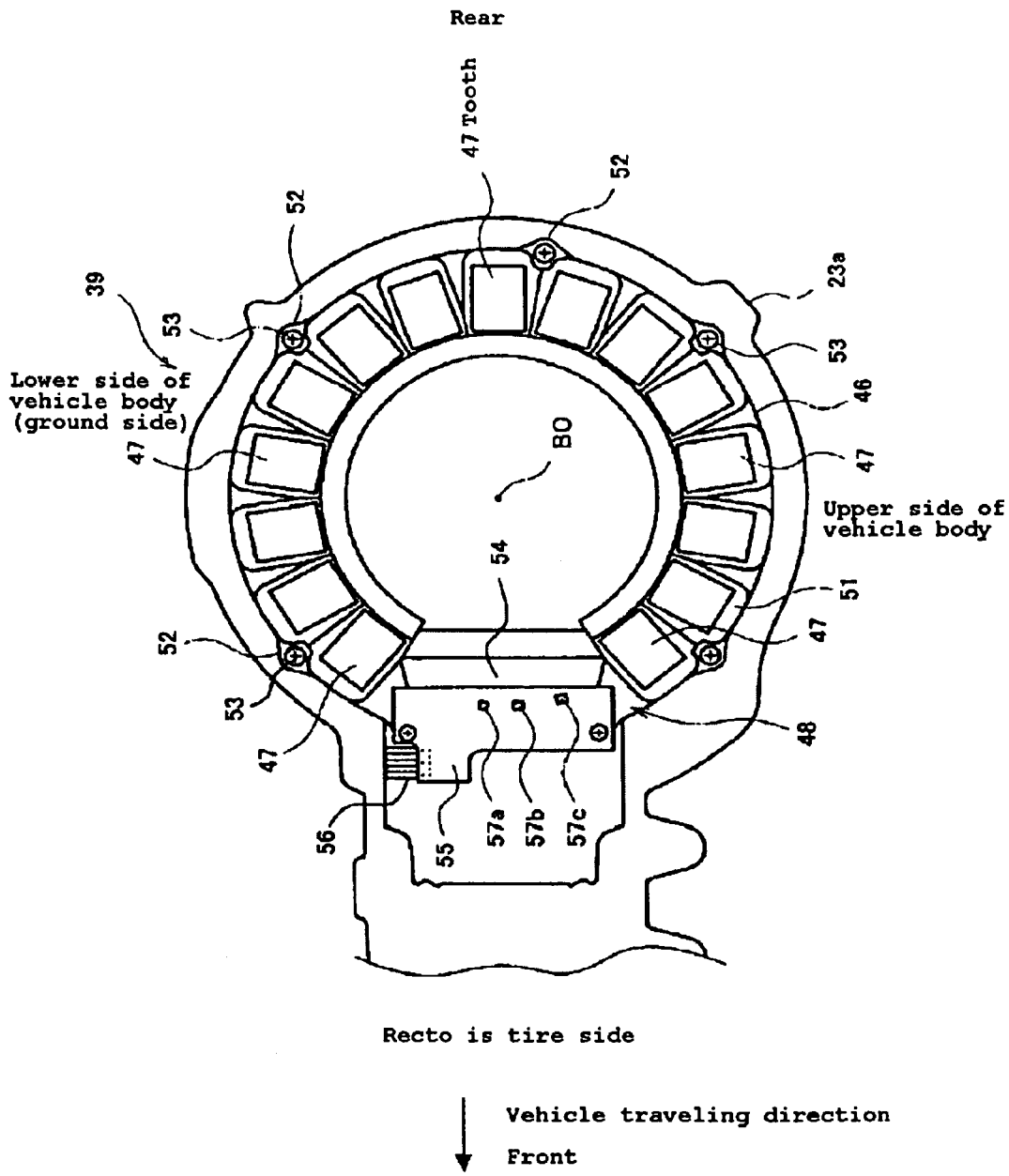
FIG. 3 shows a structure of a stator of the electric motor and the circumference thereof, as viewed from the side of the rear wheel.

FIG. 3, shows a structure of the stator 39 of the electric motor and the circumference thereof as seen from the side of the rear wheel 25. That is, in FIG. 3, the front side of the illustration corresponds to a right hand side of the vehicle body of the electromotive two-wheeled vehicle 1, the left side of the illustration corresponds to a lower side of the vehicle body, the upper side of the illustration corresponds to a rear side of the vehicle body, and the lower side of the illustration corresponds to a front side of the vehicle body.

In FIG. 3 (see FIG. 2 also), the stator 39 is fixedly positioned at the rear end 23a of the rear arm 23, and includes a stator side yoke 46. The stator side yoke 46 has a lamination layer structure in which, for example, circular steel sheets are laminated in the center axis direction. The stator side yoke 46 has a reversed C shape around the center axis BO. In other words, the stator side yoke 46 has a circular shape, one portion of which is cut away.

The stator side yoke 46 of the stator 39 has generally rectangular tooth receiving openings, which number is multiples of three, circumferentially extending about the stator side yoke 46. The stator 39 has teeth 47 fixedly positioned in the respective tooth receiving openings with a lower portion of each tooth 47 inserted into the respective recess of each tooth receiving opening. The teeth 47 are circumferentially arranged on the stator side yoke 46 at regular intervals (circumferential pitches).

Each tooth 47 is preferably a lamination layer of steel sheets, and is placed such that a top end (see FIG. 3) thereof is spaced apart from the respective field magnets 42 of the rotor 38 in the axial direction of the rotational shaft 43, so that each tooth 47 opposes the field magnets 42.

The circumferential pitch is an angle defined by line segments extending between the center axis BO and centers of adjacent top ends of the teeth 47.

The stator side yoke 46 that fixedly holds the teeth 47 is shaped as a circle, which center is consistent with the center axis BO and one portion of which is cut away, as described above. Thus, the teeth 47, which number is multiples of three, are arranged along the circular configuration of the stator side yoke 46. Thereby, teeth of three phases (e.g., U phase, V phase and W phase), corresponding to the cut-away portion of the circle, are omitted. Hereunder, the cut-away portion of the circle is called a teeth omitted portion 48.

The stator 39 includes a coil 49 (see FIG. 2) wound around each tooth 47. The stator 39 also includes a molded section 51 in which the respective teeth 47 and the coils 49 are molded with resin or the like, and a plurality of flanges 52 formed on an circumferential outer surface of the molded section 51.

As shown in FIG. 3, each flange 52 has a bolt hole for attaching the molded section 51, including the teeth 47 and the coils 49, to the rear end 23a of the rear arm 23. Bolts inserted into the bolt holes are screwed onto the rear end 23a of the rear arm 23 to fixedly position the stator 39 on the rear end 23a of the stator 39.

Also, an inverter 54, which can supply electric power to the stator 39 by being electrically connected to the stator 39, is fixed to the teeth omitted portion 48 through an elastic material, (not shown) made of rubber or the like. Further, an encoder substrate 55 is disposed in the teeth omitted portion 48. This encoder substrate 55 and the inverter 54 are electrically coupled with each other through a wire harness 56 that is preferably covered with a flexible coating (a flexible substrate or the like can replace the harness).

Magnetic pole detecting elements 57a, 57b and 57c, such as a Hall sensor, for example, are mounted on the encoder substrate 55. The magnetic pole detecting elements 57a, 57b and 57c are placed at positions where those elements detect a moment when each electrical angle of the U phase, V phase and W phase of the electric motor reaches 180 degrees (for example, when a coil current is the maximum).

Figure 4:
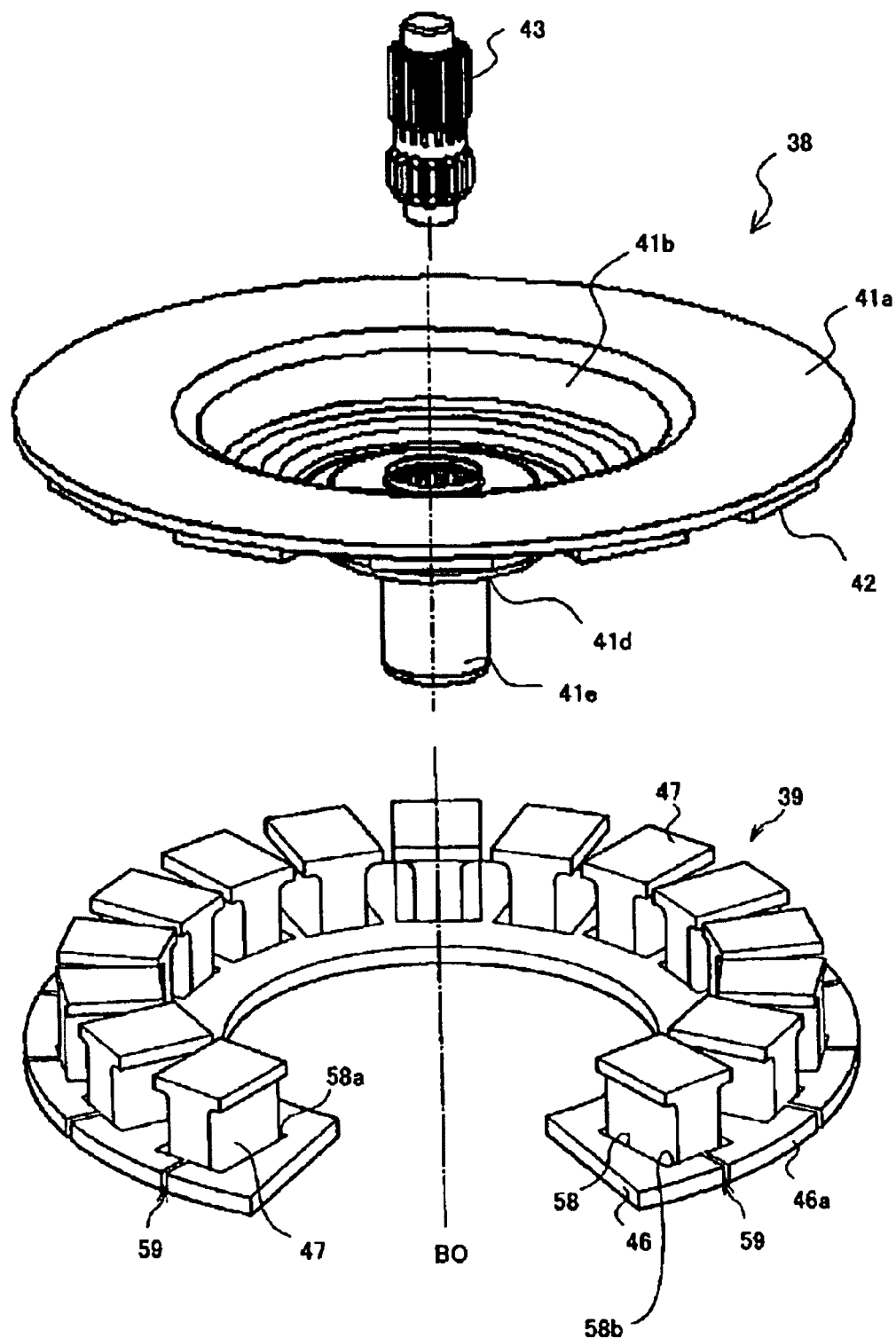
FIG. 4 is an exploded perspective view, simply and comparatively showing a schematic structure of the major part of the stator with a rotor disposed to oppose the stator and a rotational shaft of the rotor.

FIG. 4 is a perspective view, showing a schematic structure of the major part of the stator 39 of FIG. 3, together with the rotor 38 placed to oppose to the stator 39, and the rotational shaft 43 thereof. The coil 49 shown in FIG. 2, the molded portion 51 shown in FIGS. 2 and 3, and the flanges 52, the inverter 54, the encoder substrate 55 shown in FIG. 3, and so forth, are omitted from FIG. 4.

As shown in FIG. 4, on the stator side yoke 46, the respective recesses 58, each of which is formed in a generally rectangular shape and in which the respective tooth 47 is inserted and fixed, are arranged in the circular configuration. FIG. 4 also shows the portion of the stator 3a which is cut away at the circular pitches. A pair of shorter side inner surfaces 58a, 58b of each insert hole are adapted to face toward the center axis BO.

Further, a steel sheet portion next to each insert hole, and positioned between a circumferential outer surface 46a of the stator side yoke 46 and an inner side surface 58b located closer to the circumferential outer surface 46a, is cut to make a slit 59 radially extending between the inner surface 58b and the outer surface 46a.

The respective teeth 47, three of which form one set of the U phase, V phase and W phase to which a two-pole/three-phase alternating current is applied, are sequentially positioned on the stator side yoke 46 except for the teeth omitted portion 48. Even number of the field magnets 42 having the polar pair of the N pole and the S pole are disposed on the rotor 38 at regular intervals corresponding to the intervals of the set of the three phases.

Of course, as described above, the field magnets 42 can be formed from a single magnet member having the N pole and the S pole alternately magnetized, both of which are preferably formed with dielectric body portions that are permanently polarized along the same circumferential surface of a disk or ring.

That is, for example, the field magnets 42 are positioned in such a manner that either four field magnets 42, each having a polar pair, or one field magnet having four polar pairs oppose to a range involving arrangement intervals of six teeth 47 at all times. Also, the field magnets 42 are positioned in such a manner that either six field magnets 42 each having a polar pair, or one field magnet having six polar pairs, oppose a range involving arrangement intervals of nine teeth 47 at all times.

Incidentally, FIG. 4 shows fifteen teeth 47 in total. Originally, the stator can have 18 teeth 47. However, three of them are omitted to allocate the encoder substrate 55 of FIG. 3.

Thus, the electric motor is constructed in such a manner that the field magnets 42, each having 12 polar pairs, oppose a range involving arrangement intervals of fifteen teeth 47 (including the omitted portion for three teeth) at all times, whether odd number of field magnets 42 are used or one field magnet is used.

Drive Principle of an Axial Gap Type Electric Motor

Next, a drive principle of the axial gap type electric motor constructed as described above is described.

FIGS. 5(a) to (f) are illustrations for describing the drive principle of the axial gap type electric motor. In FIG. 5(a), the arrow "a" indicates a rotational direction of the rotor 38, while the arrow "b" indicates the positive direction of magnetic fluxes, when a direction of the magnetic fluxes coming from the N pole field magnet 42 (hereunder, simply called magnet 42) is selected to be positive, and a direction of the magnetic fluxes coming from the S pole magnet 42 is selected to be negative. However, all the fluxes do not flow right downward as indicated by the arrow "b," and some of them flow obliquely downward. The arrow "b" thus is given to mean that generally the magnetic fluxes flow downward.

Also, the arrow "c" indicates the positive direction of magnetic fluxes, when a direction of magnetic fluxes having the N polarity, which are generated in the coils 49 wound around the respective teeth 47 of the stator 39, with a current being supplied to the coils 49 and exited by the teeth 47 (47*u*, 47*v* and 47*w*) that are core members, is decided to be positive, and a direction of magnetic fluxes having the S polarity is decided to be negative. However, all the fluxes do not flow right downward as indicated by the arrow "b," and some of them flow obliquely downward. The arrow "b" thus is given to mean that generally the fluxes flow downward.

Figure 5:
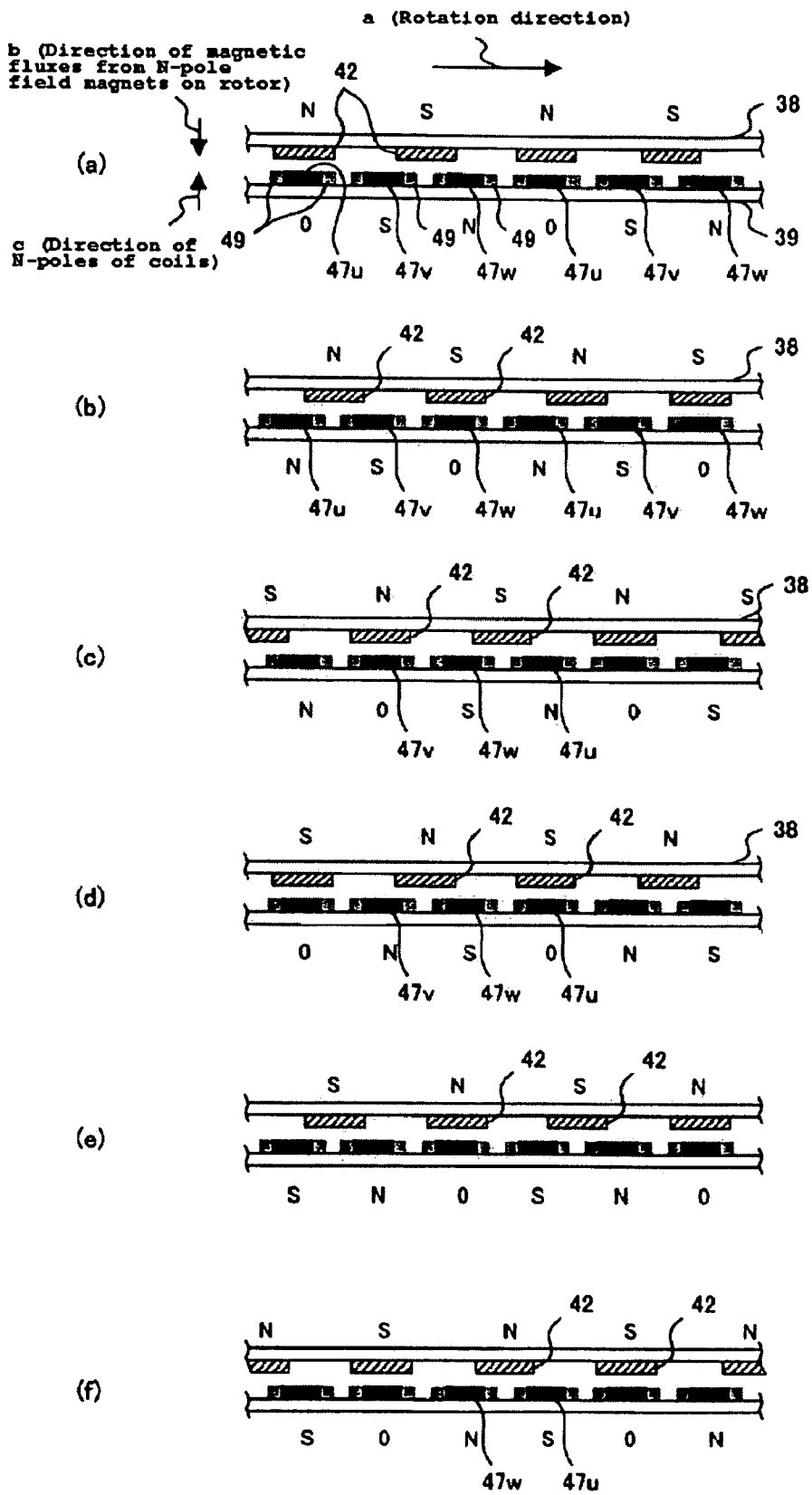
FIGS. 5(a) through (f) are schematic illustrations showing the drive principle of the axial gap type electric motor.

Also, in FIGS. 5(*a*) to (*f*), the teeth 47 of the U phase are indicated by reference numeral 47*u*, the teeth 47 of the V phase by 47*v*, and the teeth 47 of the W phase by 47*w*.

FIG. 5(*a*) shows a condition under which the N pole magnets 42 are positioned right above the U phase teeth 47*u*, while the S pole magnets 42 are positioned between the respective V phase teeth 47*v* and the respective W phase teeth 47*w*.

Under this condition, a current toward the coils 49 of the U phase teeth 47*u* is shut down, no magnetic flux is generated in the teeth 47*u*, and the magnetic fluxes from the N pole magnets 42 flow through the teeth 47*u*.

A current that can generate magnetic fluxes having the S polarity flows through the coils 49 of the V phase teeth 47*v*, and the teeth 47*v* excites the S pole magnetic fluxes. The excited S pole magnetic fluxes of the teeth 47*v* repel the S pole magnets 42, i.e., the same pole magnets, in the direction of the arrow "a."

On the other hand, a current that can generate N pole magnetic fluxes flows through the coils 49 of the W phase teeth 47*w*, and the teeth 47*w* excite the N pole magnetic fluxes. The excited N pole magnetic fluxes of the teeth 47*w* attract the S pole magnets 42, i.e., the opposite pole magnets, in the direction of the arrow "a."

The rotor 38 rotates in the direction of the arrow "a" by the torque toward the direction of the arrow "a" caused by the force of repulsion and the force of attraction, and transfers to a condition shown in FIG. 5(*b*). That is, the N pole magnets 42 are positioned between the respective U phase teeth 47*u* and the respective V phase teeth 47*v*, while the S pole magnets 42 are positioned right above the W phase teeth 47*w*.

Under this condition, the direction of the current is changed to generate N pole magnetic fluxes in the coils 49 of the U phase teeth 47*u*. The teeth 47*u* excite the N pole magnetic fluxes, and the excited N pole magnetic fluxes repel the N pole magnets 42, i.e., the same pole magnets, in the direction of the arrow "a."

On the other hand, the direction of the current is changed to generate S pole magnetic fluxes in the coils 49 of the V phase teeth 47*v*. The teeth 47*u* excite the S pole magnetic fluxes, and the excited S pole magnetic fluxes attract the N pole magnets 42, i.e., the opposite pole magnets, in the direction of the arrow "a."

Also, the current toward the coils 49 of the W phase teeth 47*w* is shut down, no magnetic flux is generated in the teeth 47*w*, and the magnetic fluxes from the S pole magnets 42 flow through the teeth 47*w*.

Also under this condition, the rotor 38 rotates in the direction of the arrow "a" by the torque toward the direction of the arrow "a" caused by the force of repulsion and the force of attraction, and transfers to a condition shown in FIG. 5(*c*).

Relationships between the teeth 47 and the magnets 42 under the condition are the same as those which shown in FIG. 5(*a*). However, each relationship between the respective tooth 47 and the respective N pole and S pole magnets 42 is shifted one by one in the direction of the arrow "a."

That is, the N pole magnets 42 are positioned right above the V phase teeth 47*v*, while the S pole magnets 42 are positioned between the respective W phase teeth 47*w* and the respective U phase teeth 47*u* which is one of the neighboring sets of the three phases.

The current of the teeth 47*v*, the teeth 47*w* and the neighboring teeth 47*u*, and the polarity of the magnetic fluxes generated in the coils 49 under the condition of FIG. 5(*c*) is the same as the current of the teeth 47*u*, the teeth 47*v* and the teeth 47*w* of sets of the three phases, and the polarity of the magnetic fluxes generated in the coils 49 under the condition of FIG. 5(*a*), respectively.

That is, under the condition, the torque in the direction of the arrow "a" is generated by the repulsive force and the attractive force, and the rotor 38 rotates in the direction of the arrow "a" by the torque and transfers to a condition shown in FIG. 5(*d*). The relationships between the teeth 47 and the magnets 42 under the condition is the same as those which shown in FIG. 5(*b*). However, also under this condition, each relationship between the respective tooth 47 and the respective one of the N pole and S pole magnets 42 is shifted one by one in the direction of the arrow "a."

That is, the N pole magnets 42 are positioned between the respective V phase teeth 47*v* and the respective W phase teeth 47*w*, while the S pole magnets 42 are positioned right above the U phase teeth 47*u* which is one of the neighboring sets of the three phases.

The current of the teeth 47*v*, the teeth 47*w* and the neighboring teeth 47*u*, and the polarity of the magnetic fluxes generated in the coils 49 under the condition of FIG. 5(*d*) is the same as the current of the teeth 47*u*, the teeth 47*v* and the teeth 47*w* of the sets of the three phases, and the polarity of the magnetic fluxes generated in the coils 49 under the condition of FIG. 5(*b*), respectively.

Hereunder, similarly, the rotor 38 transfers to a condition of FIG. 5(*e*), and further transfers to a condition of FIG. 5(*f*). The N pole magnets 42 thus are positioned between the respective W phase teeth 47*w* and the respective teeth 47*u* of the sets of the three phases. One drive relationship, which is shown on the left hand side of FIG. 5(*a*), between one set of the three phases including the U phase teeth 47*u*, V phase teeth 47V and W phase teeth 47*w* and the pair of N pole magnet 42 and S pole magnet ends.

Continuously, again, as shown in FIG. 5(*a*), another drive relationship between another one set of the three phases including the U phase teeth 47*u*, V phase teeth 47V and W phase teeth 47*w* and another pair of N pole magnet 42 and S pole magnet neighboring the pair of N pole magnet 42 and S pole magnet, the foregoing relationship of which has ended, and positioned upstream of the former pair, starts as shown in FIGS. 5(*a*) to (*f*).

Additionally, in the description of FIGS. 5(*a*) to (*f*), the positioning relationships between the magnets 42 and the teeth 47 are divided into six stages for easy understanding. Actually, however, the current applied to the coils 49 is preferably is in the form of a sine curve that is sequentially applied to three teeth 47 of each set of the three phases neighboring each other at regular phase differences. The direction and magnitude of the magnetic fluxes generated in the coils 49 by the applied current vary because the magnets 42 of the rotor rotate.

Also, respective distances between the N pole and S pole magnets 42 in an actual arrangement are shorter than those which are shown in FIGS. 5(*a*) to (*f*), and one tooth 47 can oppose both of the N pole magnet 42 and the S pole magnet 42. Additionally, if a single magnet having multiple polar pairs is used instead of the odd number of magnets 42, the N pole and the S pole contact with each other without having space therebetween.

The relationship shown in FIGS. 5(*a*) to (*f*) is sequentially shifted in the rotational direction to one another among all the sets of the three phases of the teeth 47 and the pairs of two magnets 42 in association with neighboring teeth and magnets. That is, two teeth of the set of three phases of teeth 47 and one tooth of the neighboring set of three phases of teeth 47 makes a next set of three phases, and one magnet of the pair of two magnets 42 and one of the neighboring pair of two magnets 42 makes a next pair of magnets.

The current for changing the directions of the magnetic fluxes of the coils is changed under the control of the inverter 54, and a timing of current application is given also under the control of the inverter 54 based upon the detection of rotational positions of the N pole magnet 42 and the S pole magnet 42 by the magnetic pole detecting elements 57*a*, 57*b* and 57*c* shown in FIG. 3.

As thus described, magnetic circuits are made between the rotor 38 and the stator 39 in the axial gap type motor. The excitation of the respective teeth 47 of the stator 39 is sequentially changed corresponding to the N pole and S pole of the magnets 42 of the rotor 38 via the coils wound around the respective teeth 47, thereby rotating the rotor 38 using the repulsive force and the attractive force of the magnets 42 of the rotor 38 against the excitation of the respective teeth 47.

Figure 6:
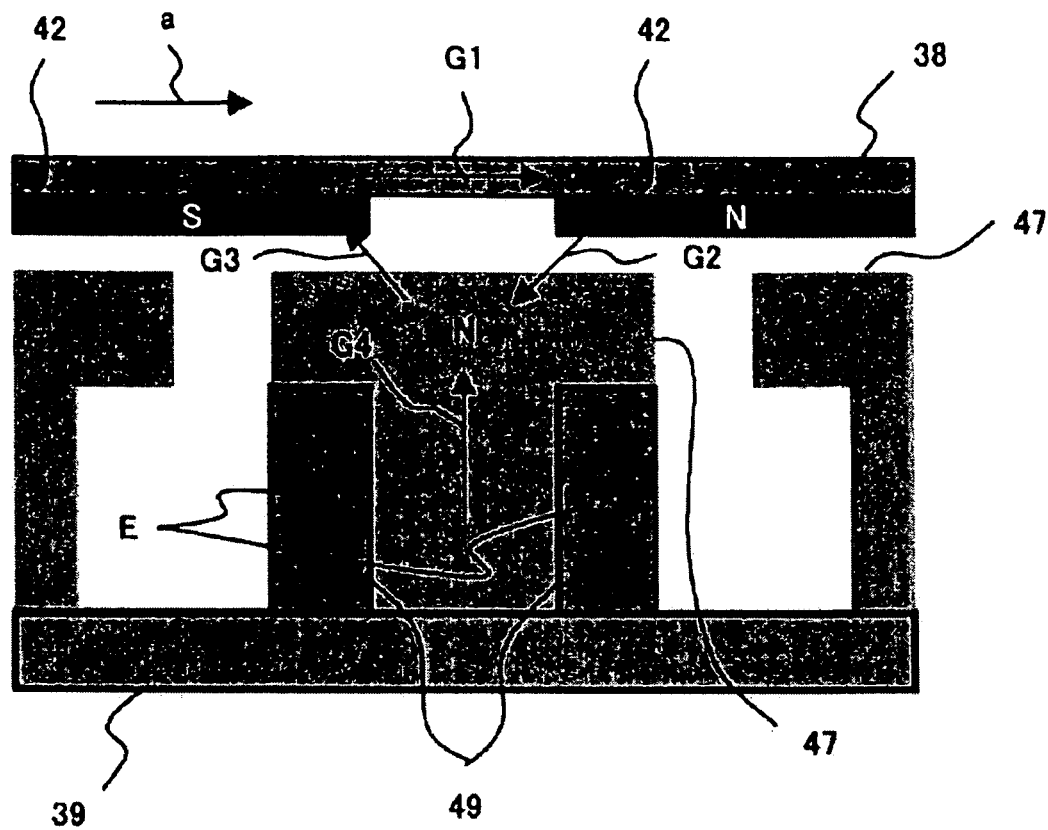
FIG. 6 is a schematic view showing a tooth opposite to both of a N pole magnet and a S pole magnet in an actual arrangement such that the N pole magnet and the S pole magnet are positioned close to each other.

FIG. 6 is an illustration, showing that one tooth 47 opposes both of the N pole magnet 42 and the S pole magnet 42 in an actual arrangement in such a manner that the N pole magnet 42 and the S pole magnet 42 are positioned close to each other. In this illustration, the arrow "a" again indicates the rotational direction of the rotor 38. Also, a direction of the magnetic fluxes flowing between the N pole magnet 42 and the S pole magnet is indicated by arrows G1, G2 and G3. Further, this condition is the same as the condition occurring transitionally when the conditions shown in FIGS. 5(*a*) to (*f*) are shifted to one another.

In FIG. 6, a current flows through the coil 49 wound around the tooth 47 on the stator 39 counterclockwise in a top plan view as indicated by an arrow E. Therefore, magnetic fluxes generated in the coil 49 and excited by the tooth 47 flow as indicated by an arrow G4, and cross the magnetic fluxes flowing between the N pole magnet 42 and the S pole magnet 42. On this occasion also, the N pole magnet 42 repels and the S pole magnet 42 attracts to generate the torque in the rotor 38 in the direction of the arrow "a."

In FIG. 6, when the magnets 42 move to other positions relative to the tooth 47, and the magnet 42 on the left hand side is replaced by the N pole magnet and the magnet on the right hand side is replaced by the S pole magnet, the direction of the current that is given to the tooth 47 is reversed from the direction indicated by the arrow E, i.e., the direction is changed to the clockwise direction in view of the top side of the illustration.

By the way, in the electric motor having the basic structure described above, the rotational power thereof does not become larger than a certain limit because of a structural restriction in its rotational speed. If converted into a speed of a motorcycle, approximately 20 km per hour is a limit in order to obtain a torque that is necessary for the vehicle, shown in FIG. 1, to run. However, it is understood that the data can vary in accordance with diameters of tires, gear ratios of drive gear systems, specifications of motors and so forth.

Figure 7:
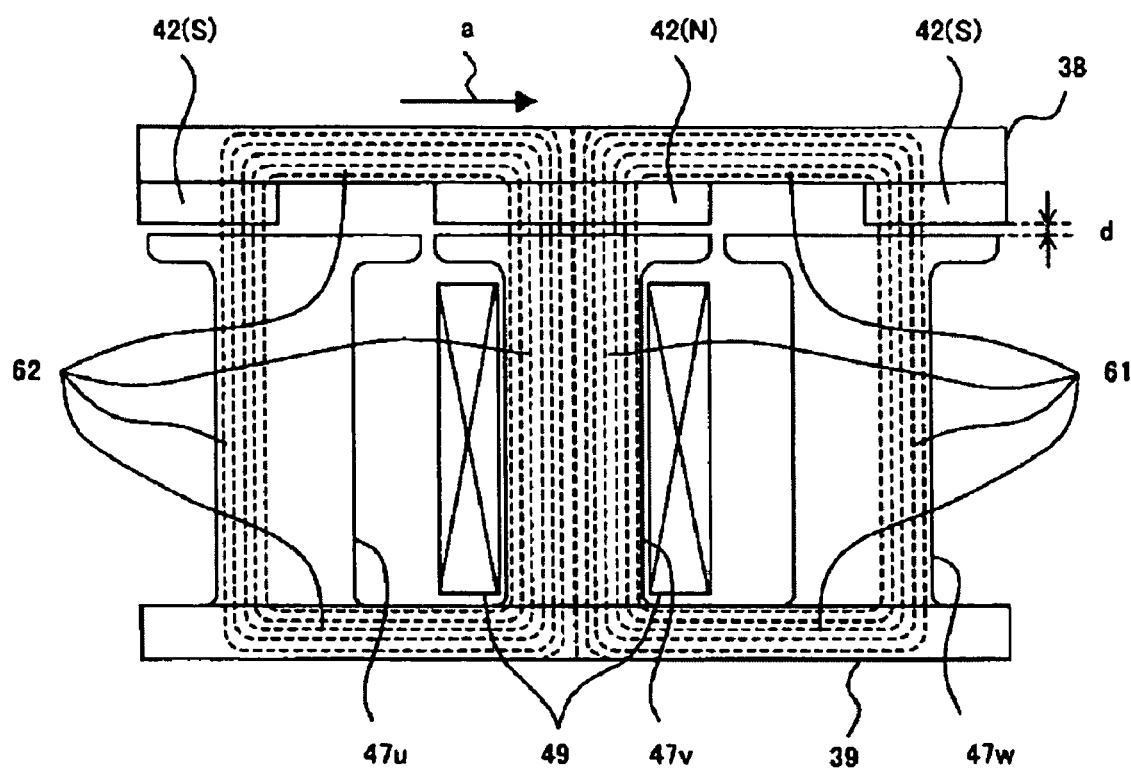
FIG. 7 is an illustration for describing reasons for the limit of the rotational speed of an axial gap type electric motor.

FIG. 7 is an illustration to describe reasons for the limit of the rotational speed of a normal electric motor. FIG. 7 shows positioning conditions of the N pole magnet 42, the V phase tooth 47*v* and others around them shown in FIG. 5(*c*).

Additionally, FIG. 7 only shows the coil 49 for the V phase tooth 47*v*, and omits the coils for the other teeth. As described with reference to FIG. 5, no current is applied to the coil 49 when the magnet 42 is positioned right above the tooth 47.

In FIG. 7, the rotor 38, the stator 39, and teeth 47 (47*u*, 47*v* and 47*w*) are preferably made of a soft magnetic material. Because a distance "d" between the opposing surfaces of the magnet 42 and the tooth 47 is extremely small, a space magnetic resistance is low. Thus, the magnetic fluxes flowing between the N pole magnet 42 (N) and S pole magnet 42 (S) are divided into two portions. One portion is a magnetic flux flow 61 while another portion is a magnetic flux flow 62, both of which flow through the magnetic poles of the magnets 42, the rotor 38, the teeth 47 and the stator 39.

Thus, larger magnetic fluxes involving the foregoing two magnetic flux flows 61 and 62, both of which merge together, pass through the coil 49 via the tooth 47*v* positioned within the coil 49.

While the rotor 38 rotates in the direction of the arrow "a," a current is generated in the coil 49, according to the Faraday's electromagnetic induction law, because the fluxes passing through the coil 49 cross the coil 49. The current generated in the coil 49 in turn generates magnetic fluxes having the S polarity from the coil 49. That is, the S pole magnetic fluxes generated in the coil 49, i.e., in the tooth 47, by the current generated in the coil 49 functions to attract the N pole magnet 42 (N).

In other words, resistive force (magnetic resistance) affects the rotation of the rotor 38. The faster the rotation of the rotor 38, the faster the speed of the magnetic fluxes, which involves the foregoing two magnetic flux flows 61 and 62 merging together in the coil 49, and crossing the coil 49. The faster the speed of the magnetic fluxes crossing the coil 49, the larger the current generated in the coil 49. The larger the current generated in the coil 49, the larger the amount of the magnetic fluxes generated in the tooth 47*v* by the current to increase the magnetic resistance of the rotor 38. Before long, the increased magnitude of the rotational power of the rotor 38 and the magnetic reluctance reach a balance with each other. This balanced condition is the limit of the rotational speed described above. Of course, the limit can go up with an increase of the electric supply. However, it is not a good plan because the consumption of the electricity increases in geometric progression.

As a method of improving the weak point of the rotational characteristic of the axial gap type electric motor to increase the rotational power, i.e., a method of shifting the rotational condition to a low torque high speed rotation from the high torque low speed rotation, a field magnet weakening control method is used.

Figure 8:
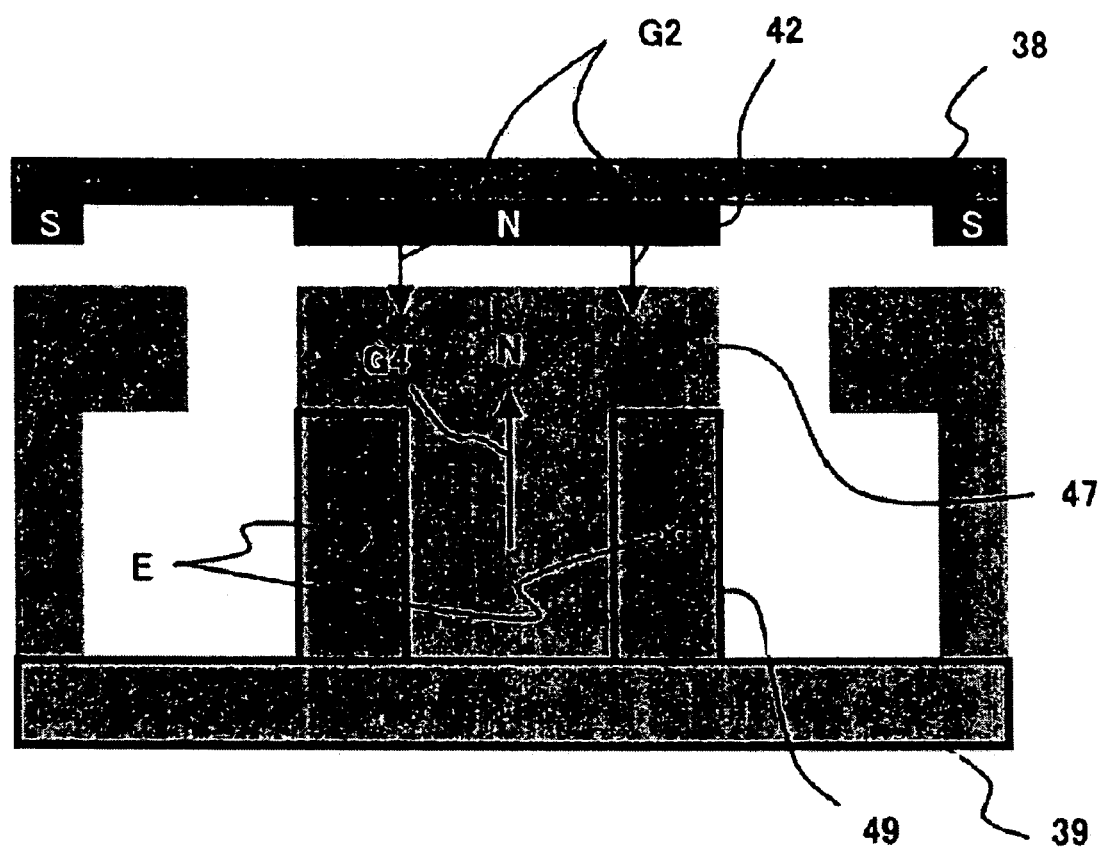
FIG. 8 schematically shows a field magnet weakening control method used for increasing the rotational speed of an axial gap type electric motor.

FIG. 8 is an illustration, schematically showing the field magnet weakening control method. Under the condition such that no current is applied to the coil 49 when the N pole magnet 42 (as to S pole magnet 42, the same) is positioned right above the tooth 47 as described with reference to FIG. 7, a large resistance affects the rotation of the rotor 38 when the rotational speed increases.

As shown, however, if a moderate current is applied to the coil 49 in the direction indicated by the arrow E when the N pole magnet is positioned right above the tooth 47 (as to S pole magnet 42, reverse direction), magnetic fluxes having the N polarity are generated in the direction indicated by the arrow G4 (as to S pole magnet 42, reverse direction). The magnetic fluxes generated by this coil function to weaken the N pole magnetic fluxes that go to the tooth 47 from the N pole magnet 42 as indicated by the arrow G2. That is, because the magnetic fluxes function to weaken the magnetic flux flows 61 and 62 shown in FIG. 7, the magnetic resistance decreases and the rotational power becomes large, corresponding to the weakened magnetic flux flows. Namely, the low torque high speed rotation can be realized.

In the field magnet weakening control method, a new current having a phase that is inconsistent with the phase of the alternating current applied to the tooth 47 having three phases (U phase, V phase and W phase) is applied when the electromagnets 42 are positioned right above the teeth 47 and the current becomes zero. That is, a current that generates magnetic fluxes in the direction of weakening the magnetic fluxes going to the coils 49 from the electromagnets 42, when the current becomes zero, is further added to a current for generating rotation (for generating torque) that is applied to the coil 49. In other words, a current that does not contribute to the rotational torque itself is newly applied.

Additionally, as a method to realize the low torque and high speed rotation of the electric motor, there is another method to enlarge the opposing distances of the rotor and the stator in the rotational direction (i.e., to enlarge the magnetic gaps between the rotor and the stator), as described above. However, the flow of the magnetic flux flow was unstable in the magnetic gaps between the rotor and the stator.

Described below are portions at which the flow of the magnetic flux flow is in good order, and how to control the flow of the magnetic flux flow using variable magnetic gaps. As a result, improved controllability of the output characteristic of the electric motor is achieved.

Structure and Operation of an Axial Gap Type Electric Motor According to a First Embodiment Based upon the basic structure and the drive principle of the foregoing axial gap type electric motor, a structure and an operation of an axial gap type electric motor according to a first embodiment is described.

Figure 9:
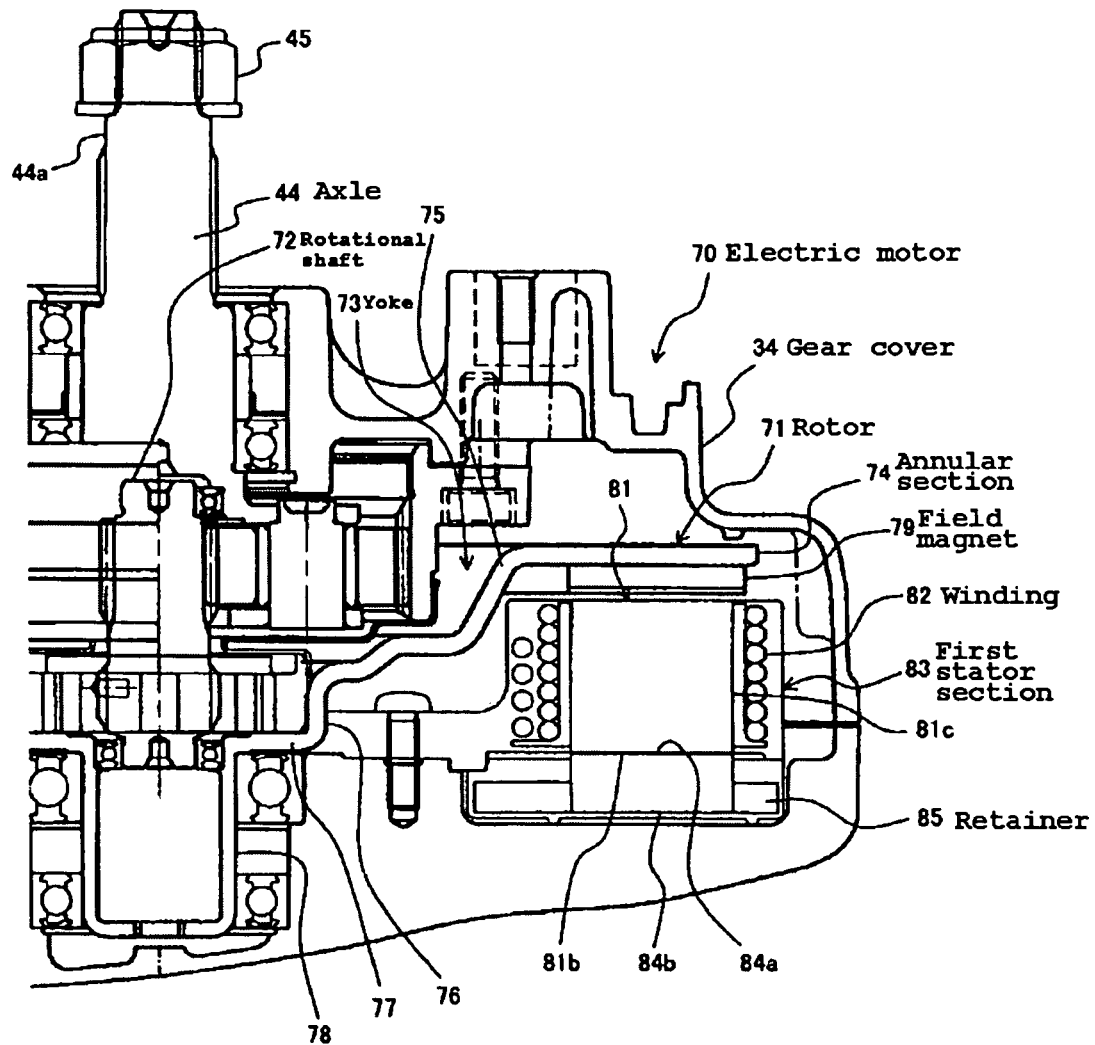
FIG. 9 is a cross sectional view, showing the axial gap type electric motor in the first embodiment together with the structure around the rear end of the rear arm.

FIG. 9 is a cross sectional view, showing an axial gap type electric motor according to the first embodiment together with the structure around the rear end of the rear arm. Additionally, in FIG. 9, the same constructive portions as those shown in FIG. 2 are assigned with the same reference numerals and symbols as those used in FIG. 2.

Figure 10:
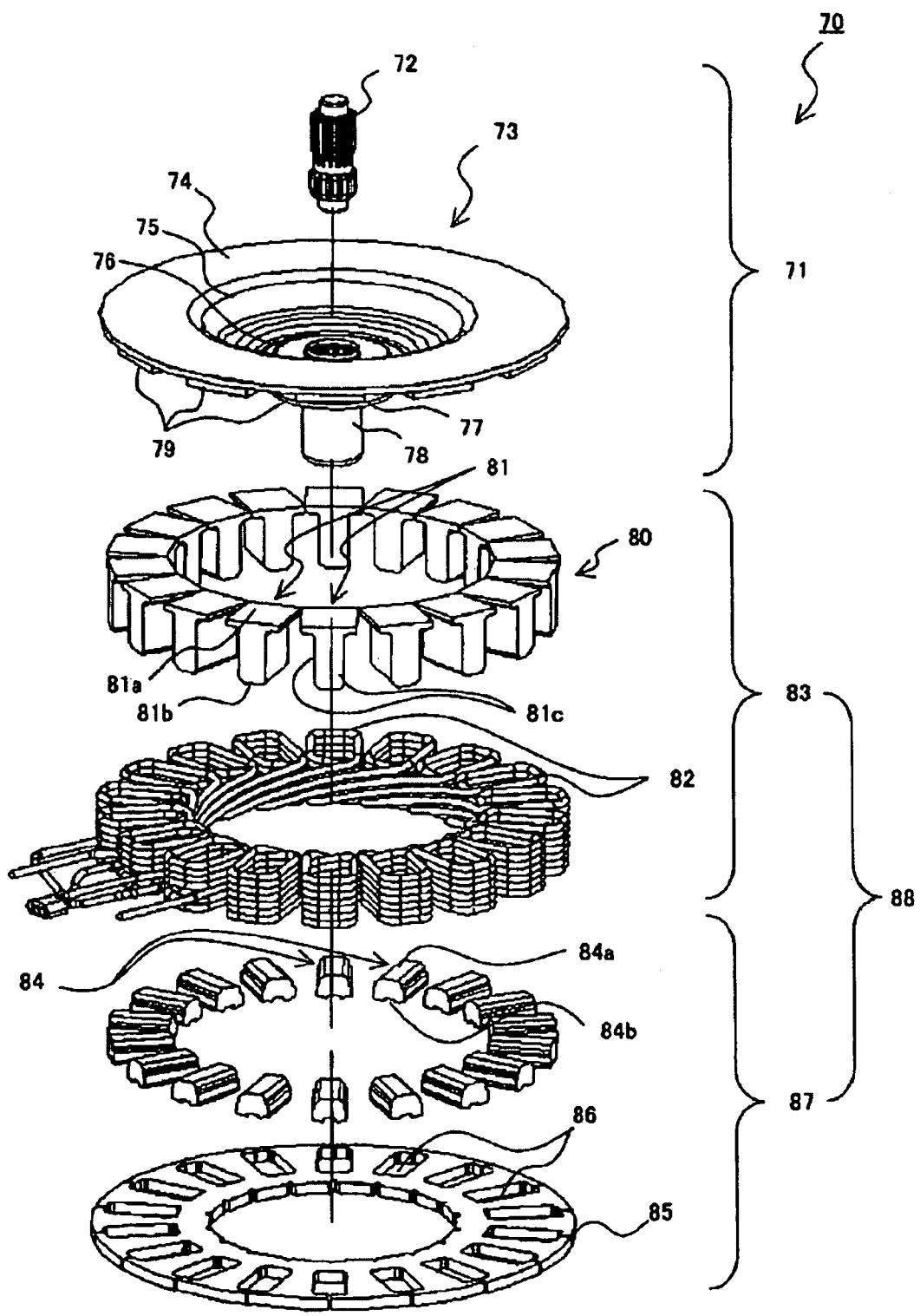
FIG. 10 is a perspective exploded view of the axial gap type electric motor of the first embodiment.

FIG. 10 is a perspective exploded view of the axial gap type electric motor according to the first embodiment. Hereunder, with reference to FIGS. 9 and 10, the structure of the axial gap type electric motor (hereunder, simply called electric motor) of the present embodiment is described.

First, the electric motor 70 of the present embodiment has a rotor 71. The rotor 71 is constructed so as to rotate about an axis of a rotational shaft 72 like a disk. The rotor 71 has the same structure as the rotor 38 shown in the basic structure of FIGS. 2 and 4.

That is, in FIG. 10, the rotor 71, the rotational shaft 72, a rotor side yoke 73, a annular section 74, a tapered section 75, a first cylindrical section 76, a annular section 77, a second cylindrical section 78, and field magnets 79 are the same as the rotor 38, the rotational shaft 41*e*, the rotor side yoke 41, the annular section 41*a*, the tapered section 41*b*, the first cylindrical section 41*c*, the annular section 41*d*, the second cylindrical section (rotational shaft) 43, and the field magnets 42, respectively, shown in FIGS. 2 and 4.

A stator (stator section) 88 is disposed opposite the rotor 71 (more specifically, a surface where a plurality of field magnets 79 are disposed). The stator 88 is divided into two portions, a first stator section 83 and a second stator section 87.

The first stator section 83 includes a first stator core 80 having a first set of teeth 81 retained by a retainer (not shown). The first set of teeth 81 are disposed in such a manner that one end surface 81*a* of each first tooth 81 opposes the rotor 72 in an axial direction. Each tooth 81 has a winding 82 wound around a circumferential side surface 81*c* thereof, except for both end surfaces (81*a*, 81*b*). Additionally, the first teeth 81 are formed in such a manner that the end surface 81*a* of each tooth 81 opposing the rotor 71 is larger than an opposite end surface 81*b*. Thus, with regard to spaces between neighboring first teeth 81, one of the spaces existing between the end surfaces 81*a* opposing to the rotor 71 is narrower than the other space between the opposite surfaces 81*b*.

Each first tooth 81 having the respective winding 82 is molded together with the winding 82 to form the respective first stator section 83, which has a circular configuration. Additionally, a drive current control for generating torque that is applied to respective windings (coils) 82 of the first teeth 81 is the current control that uses the same method as that described with reference to FIG. 5, i.e., the basic drive method that does not include the field magnet weakening control. The torque of the electric motor is generated under the drive current control.

Also, the second stator section 87 itself forms a second stator core (87) with second teeth 84, which number is the same as the number of the first teeth 81, retained by a retainer 85. Each second tooth 84 of the second stator section 87 has one end portion 84*a* that is positioned to oppose to the opposite end surface 81*b* of the first tooth 81 of the first stator section 83. Another end 84*b* of each second tooth 84 is press-fitted into one of multiple tooth receiving openings 86 that are formed on the annular retainer 85. The second teeth 84 and the retainer 85, which has the second teeth 84 press-fitted and fixed to the tooth receiving openings 86 therein, together form the second stator section 87. Preferably, the second teeth 84 and the retainer 85 are unitarily molded, though the mold is not shown in FIG. 10.

Figure 11:
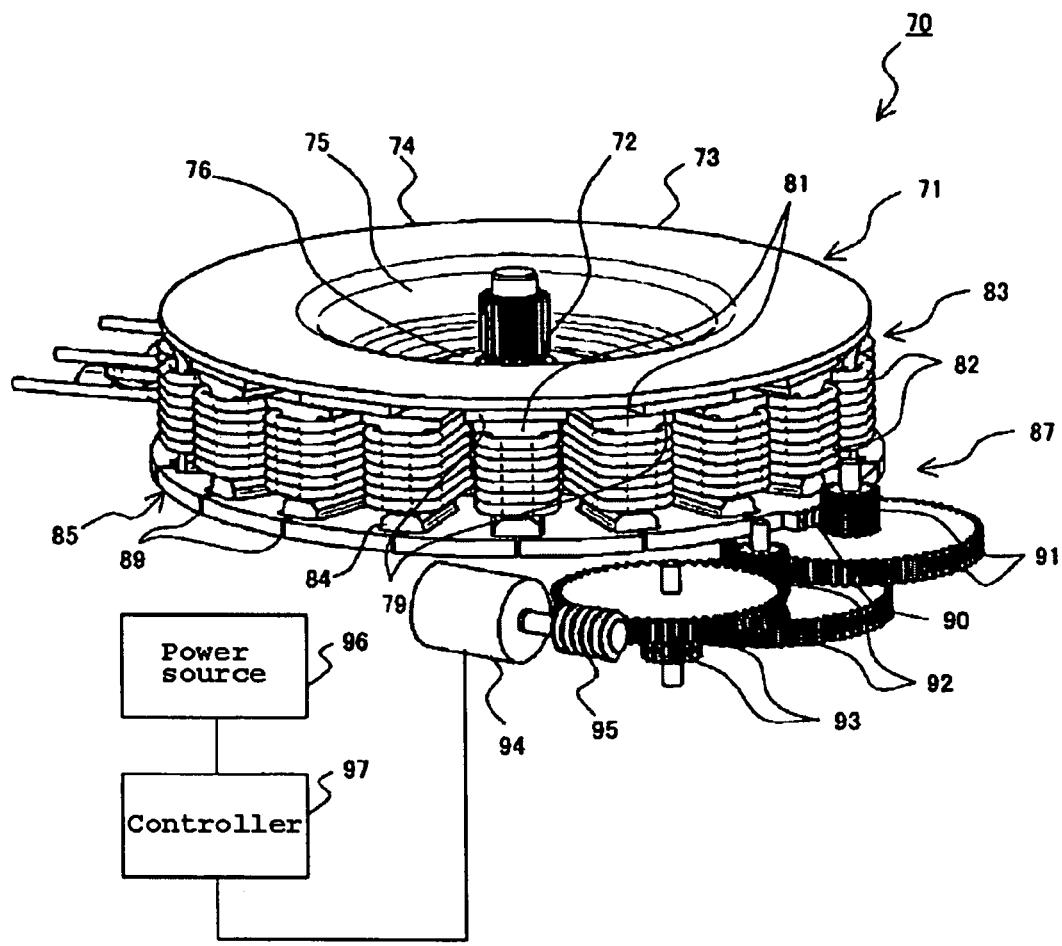
FIG. 11 is a perspective view, showing an assembled axial gap type electric motor of the first embodiment, together with a rotation control system.

FIG. 11 is a perspective view showing the electric motor 70 with the structure described above completely assembled, together with a rotation control system. The molds of the first stator section 83 and the second stator 87 are not shown in FIG. 11. Further, slits 89 which are omitted in FIG. 10 (see slits 59 of FIG. 4) are indicated in the retainer 85 of the second stator section 87 shown in FIG. 11.

As shown in FIG. 11, the rotor 71, the first stator section 83 and the second stator section 87 of the electric motor 70 shown in the exploded view of FIG. 10 are positioned in order axially along the rotational axis so as to be slightly spaced apart from one another.

The first stator section 83 is preferably fixed to the rear end 23*a* of the rear arm 23 shown in FIG. 2 by an engaging section formed at the molded portion (not shown). The second stator section 87 is preferably not completely fixed and can pivot somewhat relative to the first stator 83, as described below.

As shown in FIG. 11, a pivot mechanism for the second stator section 87 is constructed in such a manner that a toothed portion for gear engagement 90 is formed at a portion of a circumferential side surface of the retainer 85. The toothed portion 90 engages with a small diameter gear of speed reduction gears 91 of a rotation control system. A large diameter gear of the speed reduction gears 91 engages with a small diameter gear of speed reduction gears 92 in the next stage, and a large diameter gear of the speed reduction gears 92 engages with a small diameter gear of speed reduction gears 93 in the third stage. A large diameter gear of the speed reduction gears 93 engages with a worm gear 95 fixedly attached to the tip of a rotational shaft of an electric motor 94.

The motor 94 is connected to a drive pulse voltage output terminal, which is not shown, of a controller 97 to which electric power for driving circuits is supplied from a power source 96. An axis of rotation of the motor 94 in the right and reverse directions is changed to extend at right angles to its original direction by the worm gear 95. Also, the rotation is reduced in speed and is transmitted to the large diameter gear of the speed reduction gears 93. The rotation is reduced through three stages, corresponding to gear ratios between the reduction gears 93, 92 and 91, in order, and then transmitted to the toothed portion 90.

Accordingly, the second stator section 87 is constructed to be slightly movable in the rotational direction of the rotor 71 relative to the first stator section 83. That is, the second stator section 87 can continuously, intermittently and reciprocally move with a narrow pivot angle. In other words, the second stator section 87 can move steplessly, intermittently, and slightly in both the right and reverse directions along the rotational direction of the rotor 71.

Figure 12:
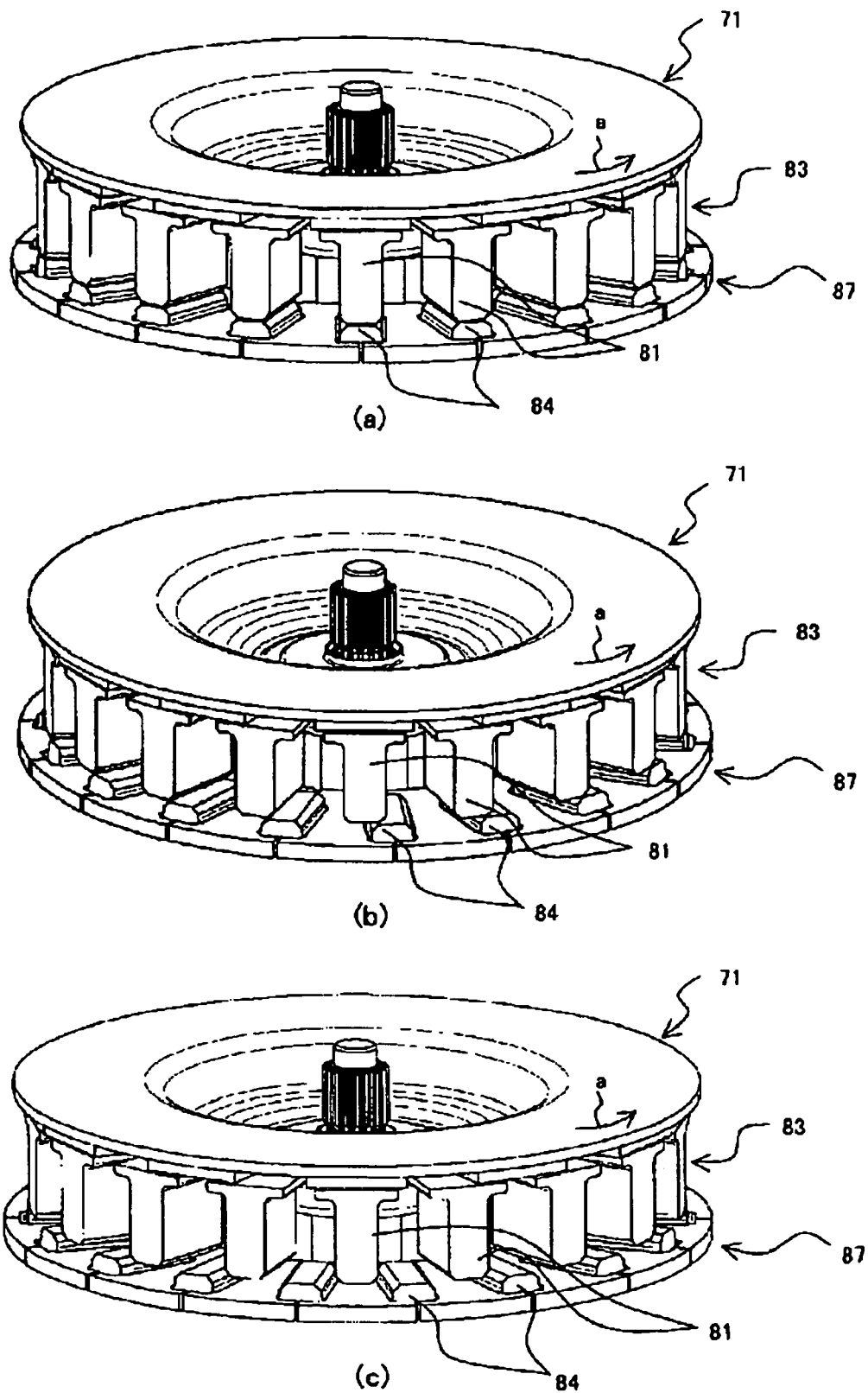
FIGS. 12(a), (b) and (c) are illustrations showing a pivot angle and an operation of a reciprocal movement made by a second stator section of the axial gap type electric motor in the first embodiment along the rotational direction of the rotor relative to a first stator section.

FIGS. 12(a), (b) and (c) are illustrations for describing the pivot angle and the operation of the reciprocal movement made by the second stator section 87 along the rotational direction of the rotor 71 relative to the first stator section 83. Additionally, in FIGS. 12(a), (b) and (c), in order to simply show transitional conditions of the second teeth 84 of the second stator section 87 relative to the first teeth 81 of the first stator section 83, the windings 82, the slits 89 and the toothed portion 90 for gear engagement, the rotation control system etc. shown in FIG. 11 are omitted in the illustrations.

FIG. 12(a) shows a positional relationship of the second teeth 84 of the second stator section 87 relative to the first teeth 81 of the first stator section 83, occurring when the high torque low speed rotation is made. In this embodiment, the position in this positional relationship is the reference position.

With the pivotal movement of the second stator section 87 described above, the second teeth 84 can pivot (e.g., via reciprocal movement) in a narrow angular range along the rotational direction of the rotor 71 indicated by the arrow "a," from the reference position shown in FIG. 12(a), i.e., a position at which each second tooth 84 directly opposes the respective first tooth 81, to the maximum movable position shown in FIG. 12(c), i.e., a right center position between adjacent first teeth 81, by way of a midway position shown in FIG. 12(b). Additionally, the midway position shown in FIG. 12(b) is illustrative of any position in the stepless and intermittent pivotal movement between the reference position and the maximum movable position.

Figure 13:
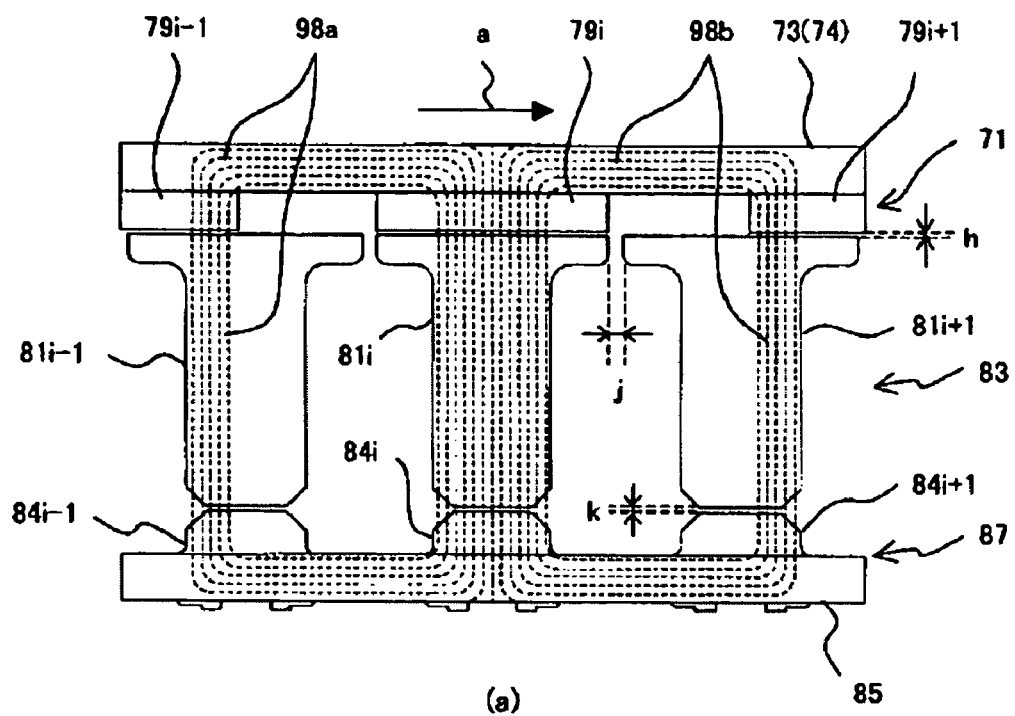
FIGS. 13(a) and (b) are schematic illustrations for describing the principle of the rotation control of the axial gap type electric motor of the first embodiment made in a range from a high torque low speed rotation to a low torque high speed rotation.
Figure 13:
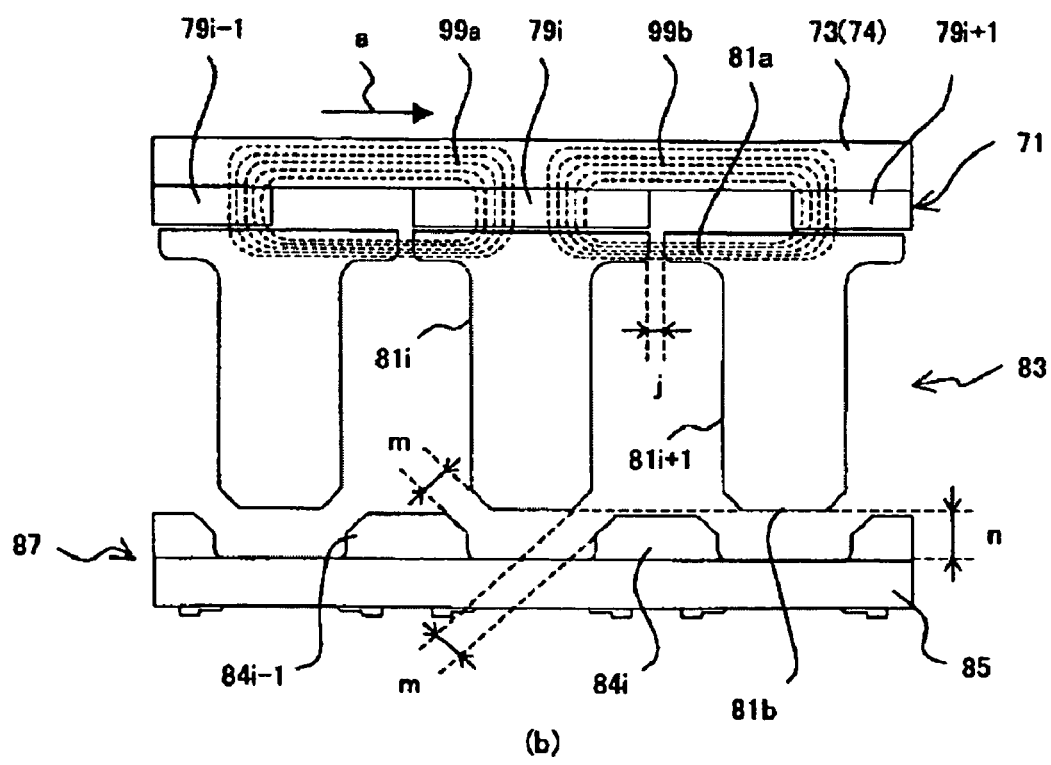

FIGS. 13(a) and (b) are illustrations for describing the principle of the rotation control of the electric motor 70 in this embodiment made in a range from a high torque low speed rotation to a low torque high speed rotation. Additionally, in order to simply show, the windings 82 wound around the respective teeth 81 and the mold are omitted in FIGS. 13(a) and (b). Similarly, the mold of the second teeth 84 and the retainer 84 is omitted in the illustrations.

Also, FIG. 13(a) shows the high torque low speed rotational condition shown in FIG. 12(a) under which each second tooth 84 directly opposes the respective first tooth 81. FIG. 13(b) shows the low torque high speed rotational condition shown in FIG. 12(c) under which each second tooth 84 is at the right center position between the adjacent first teeth 81.

FIG. 13(a) shows a condition under which the $i^{th}$ magnet 79$i$ of the rotor 71 directly opposes the $i^{th}$ first tooth 81$i$ of the first stator 83 on the stator side, and the $i^{th}$ second tooth 84$i$ of the second stator section 87 on the stator side directly opposes the first tooth 81$i$. That is, FIG. 13(a) shows the same condition as that shown in FIG. 12(a).

FIG. 13(b) shows a condition under which the positional relationship between the magnet 79$i$ of the rotor 71 and the first tooth 81$i$ of the first stator section 83 is not changed from that shown in FIG. 13(a), and the second tooth 84$i$ of the second stator section 87 is placed at the right center position between adjacent first teeth 81$i$ and 81$i$+1 of the first stator section 83. That is, FIG. 13(b) shows the same condition as that shown in FIG. 12(c).

In FIG. 13(a), the annular section 74 of the rotor side yoke 73, the first teeth 81 (81$i$–1, 81$i$, 81$i$+1) of the first stator section 83, the second teeth 84 (84$i$–1, 84$i$, 84$i$+1) of the second stator section 87 and the retainer 85, all belonging to the rotor 71, have strong permeability. Also, the opposing surfaces of the magnets 79 (79$i$–1, 79$i$, 79$i$+1) and the first teeth 81, and the opposing surfaces of the first teeth 81 and the second teeth 84 are extremely close to each other, respectively. Thus, a magnetic resistance "h" between the opposing surfaces of the magnets 79 (79$i$–1, 79$i$, 79$i$+1) and the first teeth 81, and a magnetic resistance "k" between the opposing surfaces of the first teeth 81 and the second teeth 84 are small.

Additionally, as described above, the end surface 81$a$ of each first tooth 81 opposing to the rotor 71 is formed to be larger than the other end surface 81$b$ thereof. Thus, between respective adjacent first teeth 81, a magnetic resistance "j" exists between the end surfaces 81$a$ opposing to the rotor 71 that is extremely smaller than a magnetic resistance between the other surfaces. However, this "j" magnetic resistance is larger than the magnetic resistance "h" with the rotor 71. That is, there is a relationship (h □ k<j) among the magnetic resistances.

Thus, the magnetic fluxes generated between the magnet 79$i$ (selected to be N pole) and the neighboring magnet 79$i$–1 (S pole, accordingly) hardly permeates through the portions having the magnetic resistance "j," and form a strong magnetic flux flow 98$a$ that permeates through the portions having the magnetic resistance "h," the first tooth 81$i$, the portions having the magnetic reluctance "k," the second tooth 84$i$, the retainer 85, the second tooth 84$i$–1, the retainer 85, the portions having the magnetic resistance "k," the first tooth 81$i$–1, the portions having the magnetic resistance "h," and the annular section 74.

Further, the magnetic fluxes generated between the magnet 79$i$ (N pole) and the other neighboring magnet 79$i$+1 (S pole) hardly permeates through the portions having the magnetic resistance "j," and form a strong magnetic flux flow 98$b$ that permeates through the portions having the magnetic resistance "h," the first tooth 81$i$, the portions having the magnetic resistance "k," the second tooth 84$i$, the retainer 85, the second tooth 84$i$+1, the retainer 85, the portions having the magnetic resistance "k," the first tooth 81$i$+1, the portions having the magnetic resistance "h," and the annular section 74.

These phenomena occur even though the magnet 79$i$ is not the N pole magnet but the S pole magnet, except that the magnetic fluxes flow in the reverse direction, and similarly a strong magnetic flux flow is made that flows through the associated magnet 79, first tooth 81, second tooth 84, retainer 85 and annular section 74.

As described above, the strong magnetic fluxes cause the magnetic resistance that can soon bring in the limit against the transition of the electric motor 70 to the low torque high speed rotation from the high torque low speed rotation without taking any measure. Also, as described above, there is the field magnet weakening control to delay the limit.

However, in the present embodiment, as shown in FIG. 11 and FIGS. 12(a), (b) and (c), the second teeth 84 can pivot (reciprocal movement) in the narrow angular range along the rotational direction of the rotor 71 indicated by the arrow "a" from the reference position at which each second tooth 84 directly opposes the respective first tooth 81 to the maximum movable position located at the right center position between adjacent first teeth 81.

Now, suppose that the second teeth 84 pivot to the maximum movable position shown in FIG. 13(b) from the reference position shown in FIG. 13(a). On this occasion, a magnetic resistance "m," which is larger than the magnetic resistance "k" under the directly opposing condition, is made between the opposing surfaces of each first tooth 81 and the respective second tooth 84. Further, because each second tooth 84 is positioned in the configuration to project from the retainer 85, a magnetic resistance "n" exists, which is larger than the magnetic resistance "m" made with the second tooth 84.

That is, there is a relationship "m<N" therebetween. The magnetic resistance "n" is negligible compared with the magnetic resistance "m." Thus, under the condition shown in FIG. 13(b), it is almost true that the magnetic resistance made between each second tooth and the opposite end surface 81b of the respective first tooth 81 is "m," when the second tooth 84 moves to the right center position between adjacent first teeth.

As described above, the end surface 81a of each first tooth 81 opposing the rotor 71 is formed to be larger than the other end surface 81b thereof. Thus, between the respective adjacent first teeth 81, the magnetic resistance "j" between the end surfaces 81a opposing to the rotor 71 is extremely small, and under the condition shown in FIG. 13(b), the relationship (j<2 m) exists between the magnetic resistance "j" and the magnetic resistance "m."

That is, it is true that a distance (magnetic resistance "j") defined between the end surface 81a of each first tooth 81 opposing to the rotor 71 and the end surface 81a of the adjacent first tooth 81 is smaller than the minimum distance (magnetic resistance "m") defined between each second tooth 84 and the opposite end surface 81b of the first tooth 81.

By being brought into this condition, i.e., the condition under which the relationship among the magnetic resistance of the respective members is h<j<m<n is brought, as shown in FIG. 13(b), the magnetic fluxes between the magnet 79i (N pole) and the other neighboring magnet 79i−1 (S pole) form a weak magnetic flux flow 99a that does not flow to the second tooth 84i−1 or to the retainer 85 from the first tooth 81i, due to the magnetic resistance "m" and the magnetic resistance "n," but permeates through the first tooth 81i, the portions having the magnetic resistance "j," the first tooth 81i−1 and the annular section 74.

Also, the magnetic fluxes made between the magnet 79i (N pole) and the other neighboring magnet 79i+1 (S pole) form a weak magnetic flux flow 99a that does not flow to the second tooth 84i+1 or to the retainer 85 from the first tooth 81i, due to the magnetic resistance "m" and the magnetic resistance "n," but permeates through the first tooth 81i, the portions having the magnetic resistance "j," the first tooth 81i+1, and the annular section 74.

Thus, the magnetic fluxes from the magnets 79 do not cross the windings 82 of the respective first teeth 81, and the magnetic resistance against the rotation of the rotor 71 in its rotational direction, generated by these magnetic fluxes crossing the windings 82, disappear. The rotor can rotate in a high speed, accordingly.

Also, similarly, the magnetic fluxes from the magnets 79 do not flow into the windings of the respective first teeth 81. Thus, the torque to be generated between the electrified first teeth 81 and the magnets 79 and then given to the rotor 71 is lowered. That is, the low torque high speed operation is realized.

As thus described, simply, the second teeth reciprocally move between the position at which the second teeth directly oppose the first teeth and the other position at which the second teeth are placed midway between adjacent first teeth. The entire structure thus can be compact.

Now, a space making the magnetic resistance, i.e., a gap ("j,""k,""m,""n" and so on) that causes the magnetic resistances is described. The gap that causes the magnetic resistance is defined as a magnetic resistance space of air or the equivalent. The gap that causes the magnetic resistance (hereunder, simply called gap) is further described.

FIGS. 14(a) to (e) are illustrations for describing differences between a contact area which varies a magnetic resistance between two members and a gap. Generally, it is known that, when a magnetic flux flow coming from a magnet is going to flow between the two members made of a magnetic material, if any portion is ensured to be a flow route for the magnetic fluxes, the magnet does not provide any surplus magnetic fluxes. When the two members are completely separated by a gap, the magnet tries to make the magnetic fluxes flow by any means, and the magnetic fluxes start to flow from a portion that gives the easiest route, i.e., from the narrowest gap.

Figure 14:
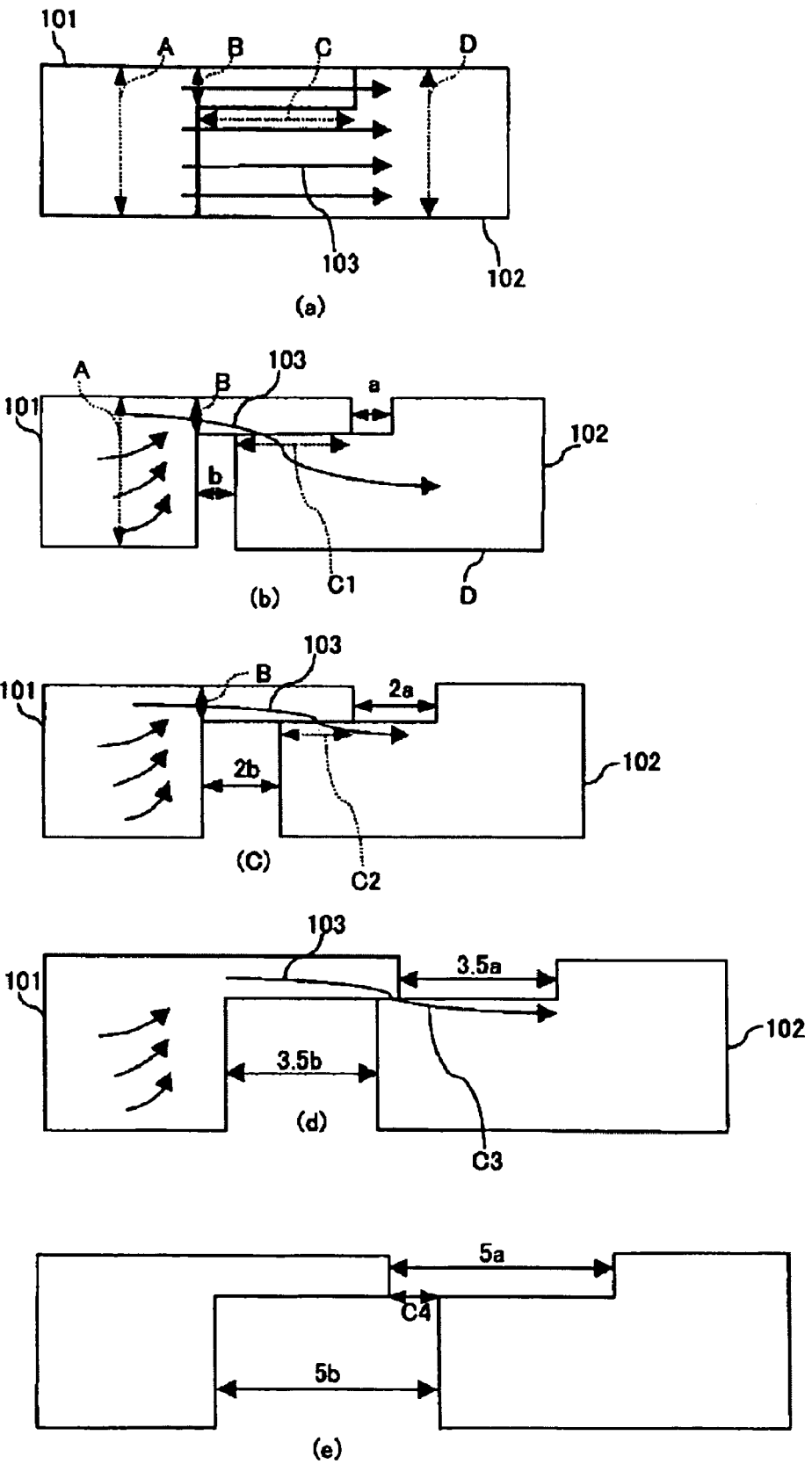
FIGS. 14(a) through (e) are schematic illustrations for describing a gap that causes a magnetic reluctance.

FIG. 14(a) shows a condition under which two magnetic members 101 and 102 configured as the letter L in their cross sections are tightly coupled with each other. A vertical cross section of the major portion of the magnetic member 101 has an area A, while a vertical cross section of a projection of the magnetic member 101 has an area B. Also, a vertical cross section of the major portion of the magnetic member 102 has an area D, while a vertical cross section of a projection of the magnetic member 102 has an area D-B. A horizontal cross section of the respective projections has an area C, which is the same as one another.

Now, the following conditions are given: area A=area D=area C=200 S, and area B=50 S. Also, it is decided that magnetic fluxes 103 coming from a magnet out of the illustration flow to the magnetic member 102 from the magnetic member 101.

Suppose that, as shown in FIG. 14(b), the two magnetic members 101 and 102 move to be relatively separated from one another by the respective distances a and b (a=b) at the area B portion of the vertical cross section and the area D-B portion of the vertical cross section, while the area C portions of the horizontal surfaces are in slide contact with each other. Upon this movement, because a space of the distance b is made between the two magnetic members 101 and 102, the magnetic flux flow flowing into the major portion of the magnetic member 101 having the area A=200 S becomes saturated at the area B portion, and reduces the magnetic flux flow that flows through the area B=50 S. This magnetic flux flow 103 flows into the magnetic member 102 via the sliding surfaces C1 (area C1=150 S, B<C1).

Next, suppose that, as shown in FIG. 14(c), the two magnetic members 101 and 102 further move to be relatively separated from one another by the respective distances 2a and 2b at the area B portion of the vertical cross section and the area D-B portion of the vertical cross section, while the area C portions of the horizontal surface are in slide contact with each other. In this situation, the magnetic flux flow becoming saturated at the area B portion also reduces to the magnetic flux flow that flows through the area B=50 S, and flows into the magnetic member 102 via the sliding surfaces C2 (area C2=100 S, B<C2).

That is, no magnetic resistance changes between conditions of FIG. 14(b) and FIG. 14(c). Specifically, the spaces that separate the two magnetic members 101 and 102 by the distances a, b or 2a, 2b in the magnetic flux direction are not spaces for causing the magnetic resistance, because the magnetic resistance does not change (is not varied), even though the distances change. Namely, the spaces are not gaps.

Further, suppose that, as shown in FIG. 14(d), the two magnetic members 101 and 102 further move to be relatively separated from one another by the respective distances 3.5a and 3.5b at the area B portion of the vertical cross section and the area D-B portion of the vertical cross section, while the area C portions of the horizontal surface are in slide contact with each other. On this occasion, each area C portion of the respective horizontal surface has a sliding surface area C3=25 S. That is, the following relationship is given: B>C3. Thus, the magnetic flux flow 103 is saturated at the sliding surface C3, and the magnetic flux flow corresponding to the area 25 S flows into the magnetic member 102.

That is, the magnetic resistance between the two magnetic members 101 and 102 changes for the first time when the area of the sliding surface C becomes smaller than the area B of the vertical cross section of the projection of the magnetic member 101. In other words, the magnetic resistance changes depending on the change of each area of the sliding surfaces between the two members.

The change of the magnetic resistance shown in FIGS. 14(c) and (d) is not caused by the changes of the separating distances between the two members (the changes 2a and 2b to 3.5a and 3.5b), but by the change of the area of the sliding surface C (the change of C2 to C3). Namely, the separating distances 3.5a and 3.5b that have changed still do not cause the gaps.

Also, FIG. 14(e) shows a condition under which the two magnetic members 101 and 102 are relatively separated from one another by the respective distances 5a and 5b at the area B portion of the vertical cross section and the area D-B portion of the vertical cross section, so that the sliding surfaces C3 are completely released from the abutting function to be separated by the distance C4.

As described above, when the two members are completely separated by a gap, the magnetic flux flow of the magnet flows through a portion that gives the easiest route, i.e., through a portion having the narrowest distance C4. Namely, the magnetic resistance is generated at the portion having the distance C4, and the distance C4 is a magnetic resistance gap. That is, the magnetic resistance varies in accordance with the change of the distance C4.

In other words, the distance C4 is a gap to vary the magnetic resistance. However, the distances 5a and 5b are not spaces to vary the magnetic resistance, i.e., those are not gaps. Any portion that is described as a gap in this embodiment is the portion that defines the distance C4 discussed above.

In the present embodiment, as thus described, the stator is divided into at least two portions, and one portion is moved at right angles to the rotational direction of the rotor, i.e., to the direction of the magnetic flux flow that flows into each core around which the respective winding is wound from the rotor to form the variable gaps, to thereby greatly change the output characteristic of the rotary electrical machine without consuming the electric power that does not contribute to the torque.

Figure 15:
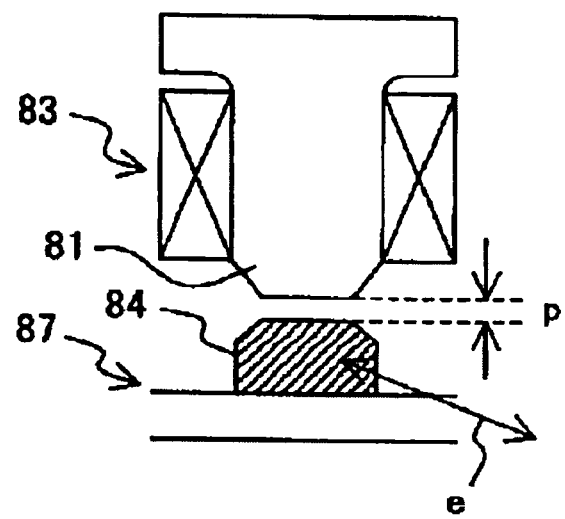
FIGS. 15(a) and (b) are schematic illustrations showing a structure of the major part of an alternative (first one) of the axial gap type electric motor of the first embodiment.
Figure 15:
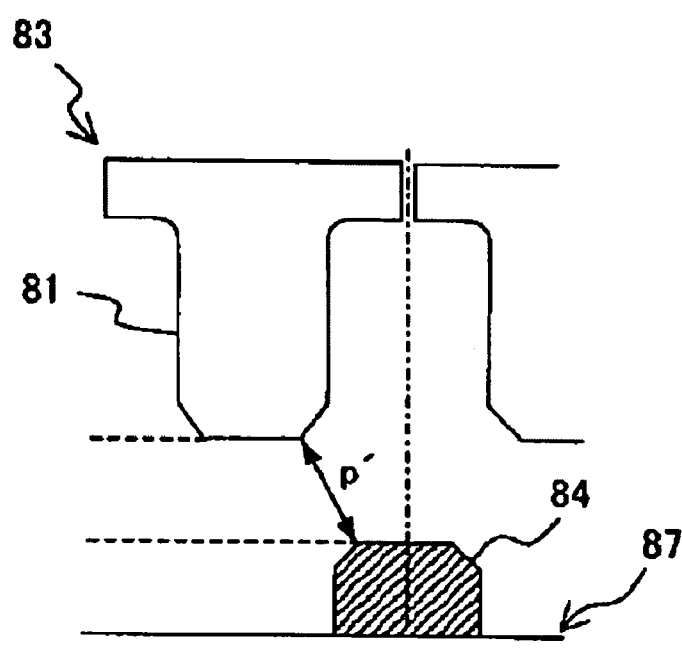

FIGS. 15(a) and (b) show a structure of the major part of an alternative of the axial gap type electric motor in the first embodiment.

FIG. 15(a) shows a condition that is the same as the condition shown in FIG. 13(a), under which each first tooth 81, of the first stator section 83 directly opposes the respective second tooth 84 of the second stator section 87. From this condition, each second tooth 84 in this embodiment obliquely moves downward to be separated from the respective first tooth 81 as indicated by the two-headed arrow "e" of the illustration. That is, as shown in FIG. 15(b), the second stator section 87 moves in a direction parallel to the rotational direction of the rotor 71 that exists out of the illustration and also moves in a direction perpendicular to the rotational direction of the rotor 71.

Thus, a distance, between each first tooth 81 of the first stator section 83 and the respective second tooth 84 of the second stator section 87, and in the direction perpendicular to the rotational direction of the rotor 71, changes from a distance "p" shown in FIG. 15(a) to a distance "p'" shown in FIG. 15(b) (p'>p). That is, a magnetic resistance gap between each first tooth 81 and each second tooth 84 is larger than that in the structure shown in FIG. 13(b). Therefore, the output characteristic of the electric motor can vary on a larger scale.

FIGS. 16(a) to (d) show a structure of the major part of another alternative of the axial gap type electric motor in the first embodiment.

Figure 16:
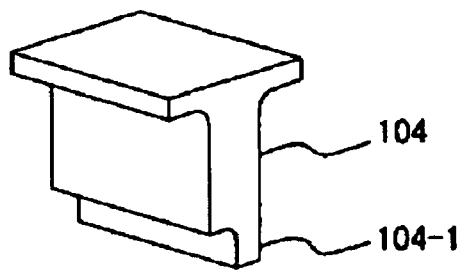
FIGS. 16(a) through (d) are schematic illustrations showing a structure of the major part of another alternative (second one) of the axial gap type electric motor of the first embodiment.
Figure 16:
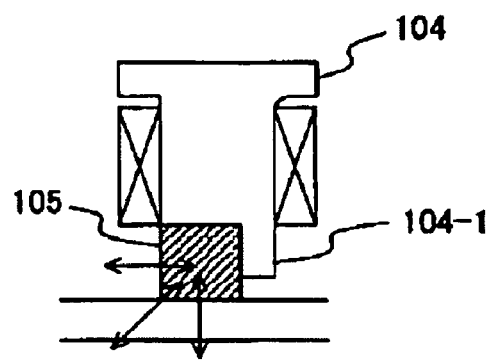
Figure 16:
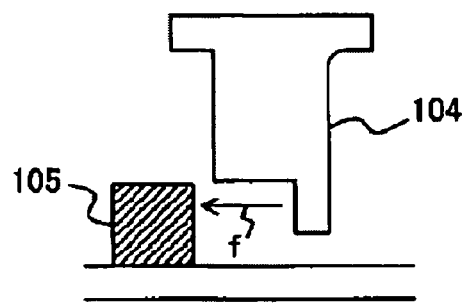
Figure 16:
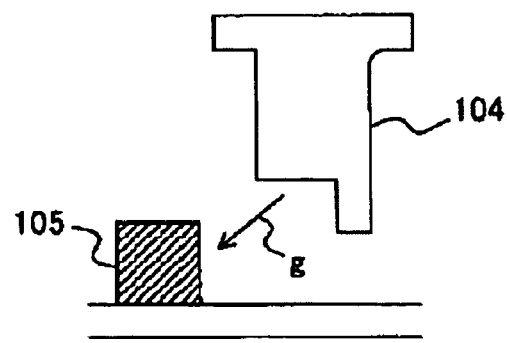

As shown in FIGS. 16(a) and (b), each first tooth 104 has a protruding portion 104-1 abutting on a side surface of the respective second tooth 105 and an end surface that opposes one end surface of the second tooth 105. Each first tooth 104 therefore prohibits the respective second teeth 105 from moving rightward beyond the right opposing positions shown in FIG. 16(b).

In this embodiment, each second tooth 105 also not only moves in the direction parallel to the rotational direction of the rotor 71 that exists out of the illustration but also moves in the direction perpendicular to the rotational direction of the rotor 71. That is, each second tooth 105 obliquely moves downward to be separated from the respective first tooth 81.

FIG. 16(c) shows an alternative in which each second tooth 105 moves horizontally as indicated by the arrow "f," while FIG. 16(d) shows another alternative in which each second tooth 105 obliquely moves downward as indicated by the arrow "g."

In this alternative, also a magnetic resistance gap between each first tooth 104 and each second tooth 105 is larger than that in the structure shown in FIG. 13(b). Therefore, the output characteristic of the electric motor can vary on a larger scale.

Structure and Operation of an Axial Gap Type Electric Motor According to a Second Embodiment FIGS. 17(a) to (d) show a structure of the major part of an axial gap type electric motor in a second embodiment.

Figure 17:
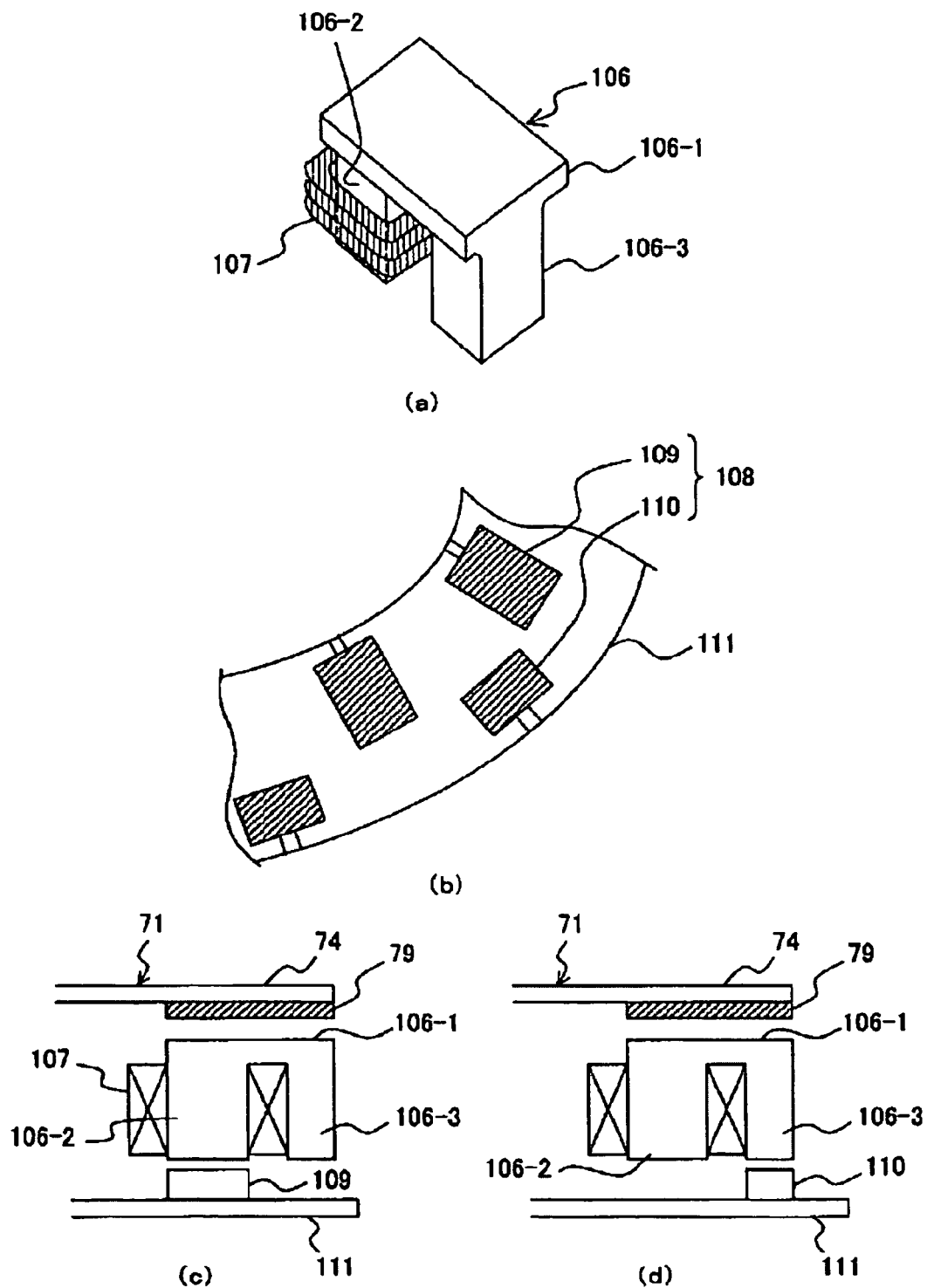
FIGS. 17(a) through (d) show a structure of the major part of an axial gap type electric motor of a second embodiment.

As shown in FIGS. 17(a) and (c), each first tooth 106 in this embodiment is formed in such a manner that a portion lower than an end portion 106-1 facing the annular section 74 of the rotor 71 includes a winding-possessing-portion 106-2 having a winding 107 positioned around it and a non-winding-possessing portion 106-3 having no winding positioned around it.

In this connection, as shown in FIGS. 17(b) and (c), each second tooth 108 is divided into an inner tooth portion 109 corresponding to the winding-possessing-portion 106-2 of the respective first tooth 106 and an outer tooth portion 110 corresponding to the non-winding-possessing-portion 106-3 of the each first tooth 110.

The inner tooth portion 109 of each second tooth 108 is placed at an inner side (side radially closer to the center axis) of the annular retainer 111, while the outer tooth portion 110 is placed at an outer side of the retainer 111 and at a middle position between two adjacent tooth portions 109.

A condition shown in FIG. 17(c) is the same as the condition shown in FIG. 13(a), because the winding-possessing-portion 106-2 of each first tooth 106 and the inner tooth portion 109 of each second tooth 108 directly oppose each other. Also, because the non-winding-possessing-portion 106-3 and the outer tooth portion 110 are placed at the outer side of the circular arrangement and are alternately positioned, the magnetic gap is extremely large, and they nearly do not affect the magnetic flux flow.

On the contrary, a condition shown in FIG. 17(d) is the same as the condition shown in FIG. 13(b) regarding a positioning relationship between the winding-possessing-portion 106-2 of each first tooth 106 and the inner tooth portion 109 of each second tooth 108a. Each non-winding-possessing portion 106-3 and the respective outer tooth portion 110 directly oppose to each other.

That is, the magnetic fluxes of each field magnet 79 flow through the respective non-winding-possessing portion 106-3 and outer tooth portion 110 and the retainer 111, and nearly do not flow through the winding-possessing-portion 106-2 of each first tooth 106. Namely, the magnetic fluxes of each winding-possessing-portion 106-2 can be shut off stronger than the embodiment shown in FIG. 13(b).

Additionally, in the first and second embodiments, the opposing surfaces of the rotor and the stator, and the opposing surfaces of the stator sections, which are the two portions of the divided stator, are arranged to extend parallel to (horizontally in the illustrations) the rotational surface of the rotor; however, the opposing surfaces of those components are not limited to such parallel arrangement.

Figure 18:
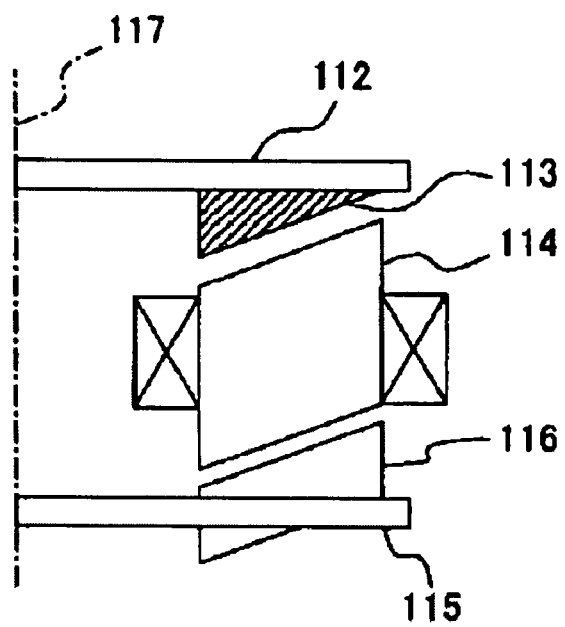
FIGS. 18(a) and (b) are schematic illustrations showing an alternative, in which the opposing surfaces of the rotor and the stator, and the opposing surfaces of the stator sections, which are two portions of the divided stator, form surfaces other than horizontal surfaces.
Figure 18:
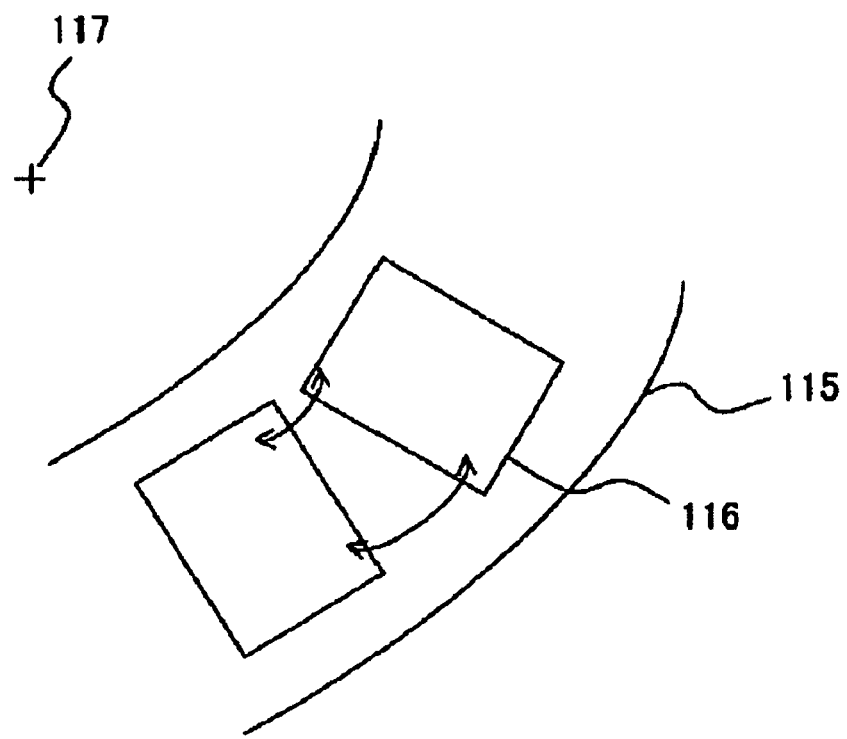

FIGS. 18(a) and (b) show a further alternative wherein the opposing surfaces of the rotor and the stator, and the opposing surfaces of the stator sections, which are the two portions of the divided stator, extend slantwise in the axial direction.

In the alternative shown in FIGS. 18(a) and (b), the respective opposing surfaces of the field magnets 113 retained by the retainer 112, the first teeth 114, and the second teeth 116 retained by the retainer 115 extend upward outward relative to the center 117 of the rotor 112 in its radial direction. With this alternative structure, the same actions and effects can be obtained as those in the first and second embodiments.

Structure of a Radial Gap Type Electric Motor
According to a Third Embodiment

Figure 19:
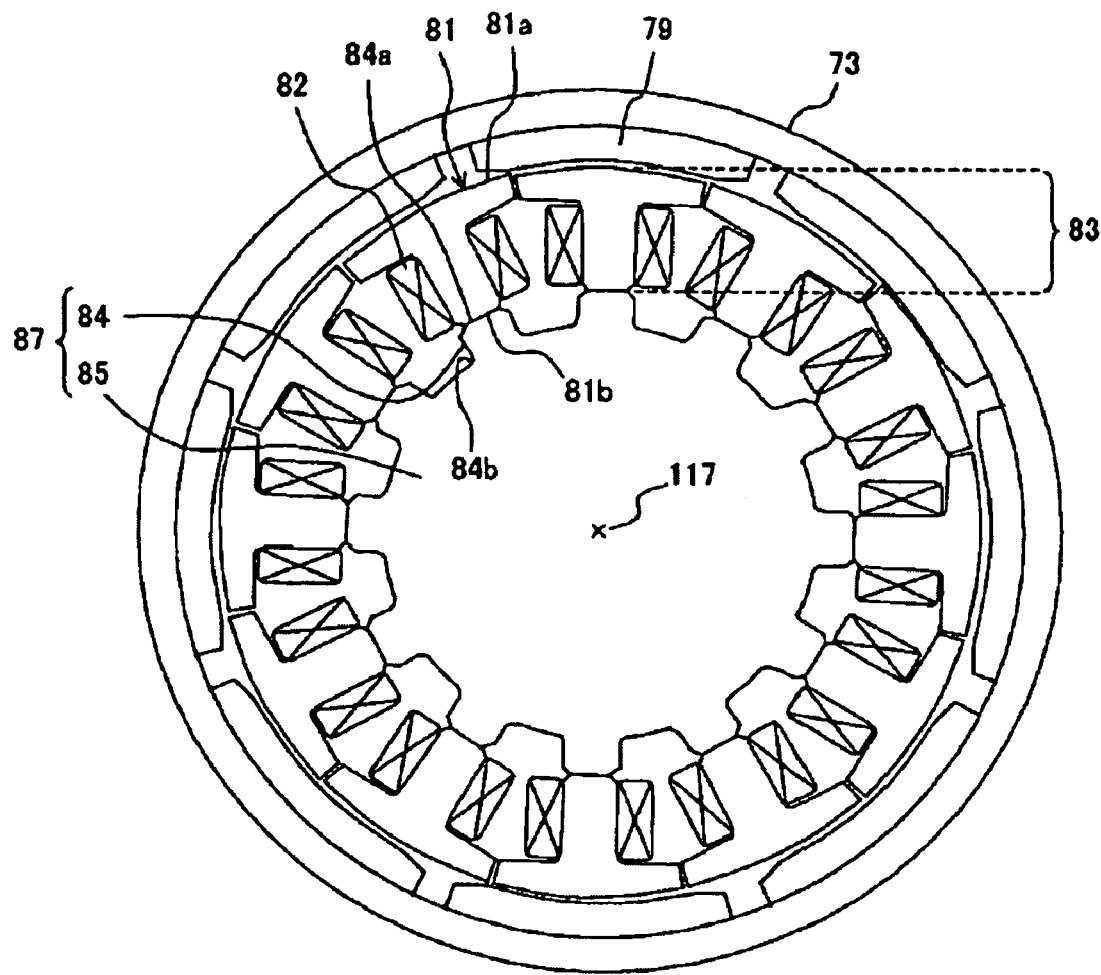
FIG. 19 is a cross sectional view, showing a structure of a radial gap type electric motor according to a third embodiment.

FIG. 19 is a cross sectional view, showing a structure of a radial gap type electric motor according to a third embodiment.

Additionally, in the illustration, in order to simply show the third embodiment in comparison with the first embodiment, components having the same functions are assigned with the same reference numerals as those assigned in FIG. 10.

As shown in the illustration, this radial gap type electric motor includes a cylindrical rotor 73 rotating about an axis of a rotational shaft (indicated by a rotational center 117 in the illustration), and a first stator core 83 positioned inside of the cylindrical rotor 73 and having a plurality of first teeth 81, one end surfaces of which oppose to the rotor 73. A winding 82 is wound around a circumferential side surface of each first tooth 81 except for both the end surfaces 81a and 81b thereof.

The electric motor further includes a second stator core 87 having a plurality of second teeth 84. Each second tooth 84 has one end surface 84a positioned to oppose the end surface of the first tooth 81 that faces in an opposite direction from the rotor 73. The second tooth 84 also has another end surface 84b retained in a retainer 85.

In this radial gap type electric motor, the second stator core 87 moves at right angles to a direction of flow of magnetic fluxes that are generated, when the magnetic windings 82 of the first stator core 83 are electrified, to permeate through the respective first teeth 81, i.e., clockwise or counterclockwise in the illustration. Therefore, the same field magnet control as that described with reference to FIGS. 13(a) and (b) can be practicable.

Structure of a Radial Gap Type Electric Motor
According to a Fourth Embodiment

Figure 20:
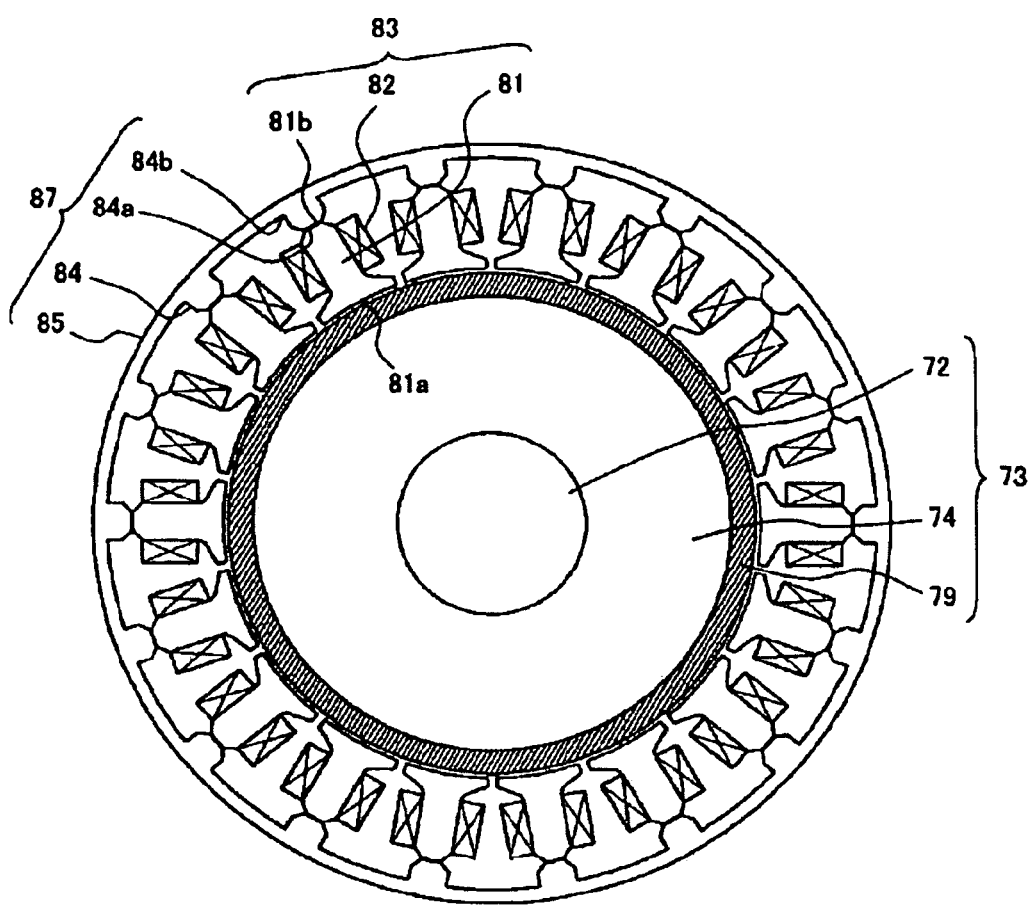
FIG. 20 is a cross sectional view, showing a structure of a radial gap type electric motor according to a fourth embodiment.

FIG. 20 is a cross sectional view, showing a structure of a radial gap type electric motor according to a fourth embodiment.

Additionally, also in the illustration, in order to simply show the fourth embodiment in comparison with the first embodiment, components having the same functions are assigned with the same reference numerals and symbols as those assigned in FIG. 10.

As shown in the illustration, this radial gap type electric motor includes a columnar or cylindrical rotor 73 rotating about a rotational shaft 72, and a first stator core 83 positioned outside of the rotor 73 in its radial direction. The first stator core 83 has a plurality of first teeth 81, one end surfaces of which oppose the rotor 73. A winding is wound around a circumferential side surface of each first tooth 81, except for both the end surfaces 81a and 81b thereof The electric motor further includes a second stator core 87 having a plurality of second teeth 84. Each second tooth 84 has one end surface 84a positioned to oppose the end surface 81b of the first tooth 81 that faces in a direction opposite the rotor 73. The second tooth also has also an other end surface 84b retained in a retainer 85.

In this radial gap type electric motor, the second stator core 87 moves at right angles to a direction of flow of magnetic fluxes that are generated when the magnetic windings 82 of the first stator core 83 are supplied with the electric power and permeates through the respective first teeth 81, i.e., clockwise or counterclockwise in the illustration. Thus, the same field magnet control as that described with reference to FIGS. 13(a) and (b) can be practicable.

Structure of an Axial Gap Type Electric Motor
According to a Fifth Embodiment

Figure 21:
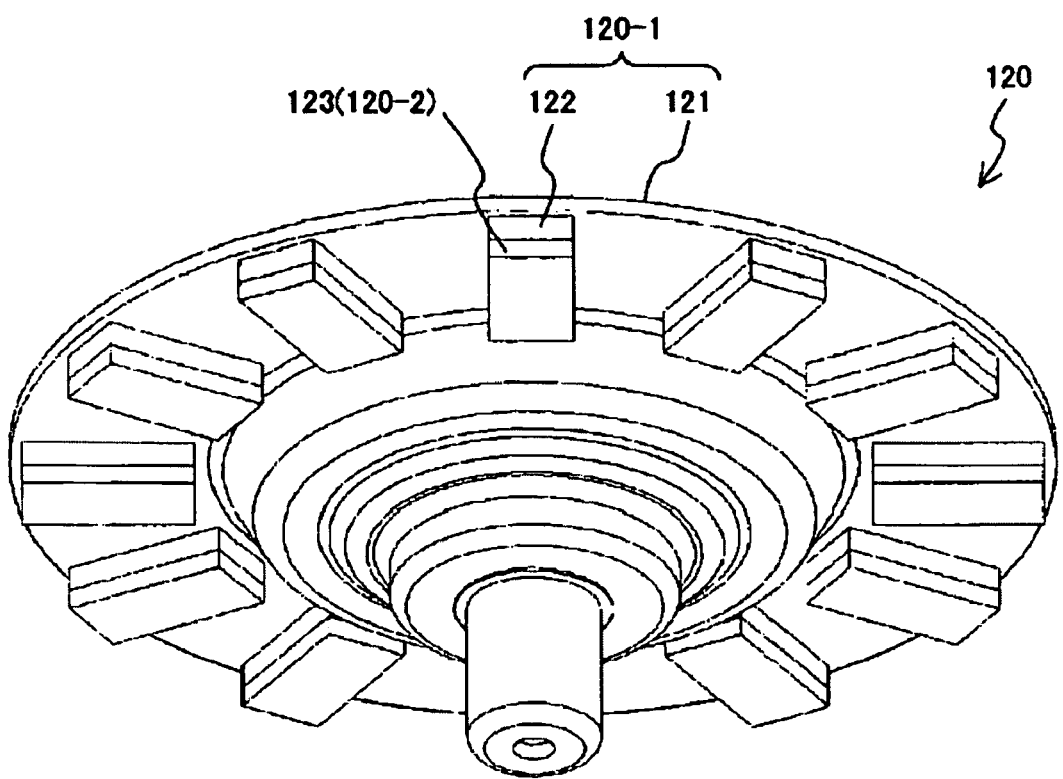
FIG. 21 is a perspective bottom view showing a structure of a radial gap type electric motor according to a fifth embodiment.

FIG. 21 is a perspective view, showing the major part of an axial gap type electric motor according to a fifth embodiment.

This illustration only shows a rotor of the axial gap type electric motor of this embodiment.

As shown in FIG. 21, first, the rotor 120 of this embodiment includes a plurality of field magnets 122 fixedly positioned on a annular section 121 of a rotor yoke of a first rotor section 120-1.

Next, the rotor 120 includes a second rotor section 120-2 constructed in such a manner that magnetic members 123, which number is the same as the number of the field magnets 122, are disposed on a rotary retainer (not shown) to nearly slidably contact with a rotational surface of each field magnet 122, and the second rotor section 120-2 coaxially engages with the first rotor section 120-1 and rotates together with the first rotor section 120-1.

A stator that is positioned to oppose to the rotor 120 has the same structure as that of the stator 39 shown in FIGS. 3 and 4.

In this axial gap type electric motor of this embodiment, when it makes a low speed high torque rotation, as shown in FIG. 21, the first rotor section 120-1 and the second rotor section 120-2 are positioned in such a manner that the respective field magnets 122 and the magnetic members 123 entirely overlap with each other to rotate in phase.

Thereby, magnetic fluxes of the field magnets 122 are controlled to gather in the respective magnetic members 123 and then flow into teeth of the stator.

Figure 22:
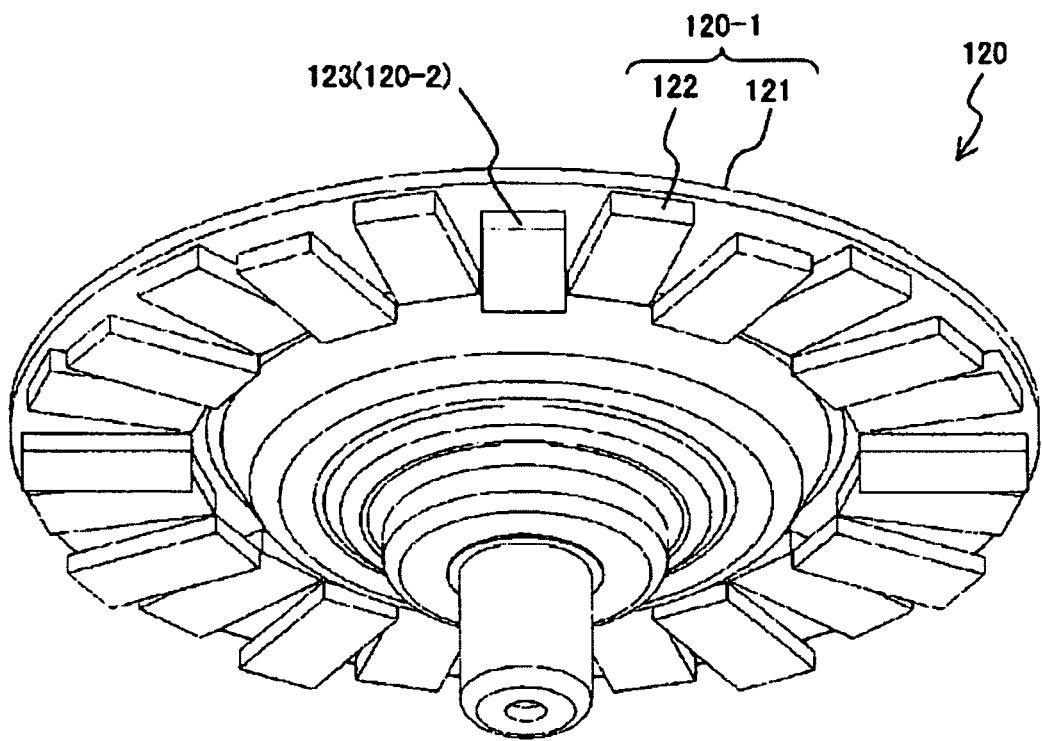
FIG. 22 is a perspective bottom view showing a relationship of displacement of a rotational phase between the first rotor section and the second rotor section when the rotor makes a high speed low torque rotation in the structure of the axial gap type electric motor according to the fifth embodiment.

FIG. 22 is an illustration, showing a relationship of displacement of the rotational phase between the first rotor section 120-1 and the second rotor section 120-2 when the rotor 120 makes a high speed low torque rotation in the structure. FIG. 22 shows a condition under which the displacement of the rotational phase between the first rotor section 120-1 and the second rotor section 120-2 is the maximum.

The first rotor section 120-1 and the second rotor section 120-2 can move relative to each other between the condition under which the phases are consistent with one another as shown in FIG. 21 and the condition under which the phases are displaced within 15 degrees from one another as shown in FIG. 22.

Under the condition that the phases are displaced with 15 degrees as shown in FIG. 22, a magnetic gap between each field magnet 122 and the respective magnetic member 123 becomes extremely large at large portions in a width direction of the rotational shaft, except for a relatively small gap partially formed at end portions located close to the rotational center. Thus, almost the entire magnetic flux flow of each field magnet 122 flow through the neighboring field magnet 122 via the annular section 121 to reflux.

The magnetic flux flow that flows into the magnetic member 123 through the small gap formed at the portions close to the rotational center is an extremely small portion of the entire magnetic flux flow. Also, the magnetic gap between each magnetic member 123 and the respective tooth of the stator becomes extremely large at large portions in the width direction of the rotational shaft, except for a relatively small gap partially formed at end portions located close to the rotational center.

Thus, the magnetic flux flow that slightly flows into each magnetic member 123 from the respective field magnets 122 does not flow through the tooth of the stator. Thereby, the drive condition during the high speed low torque rotation can be realized.

Figure 23:
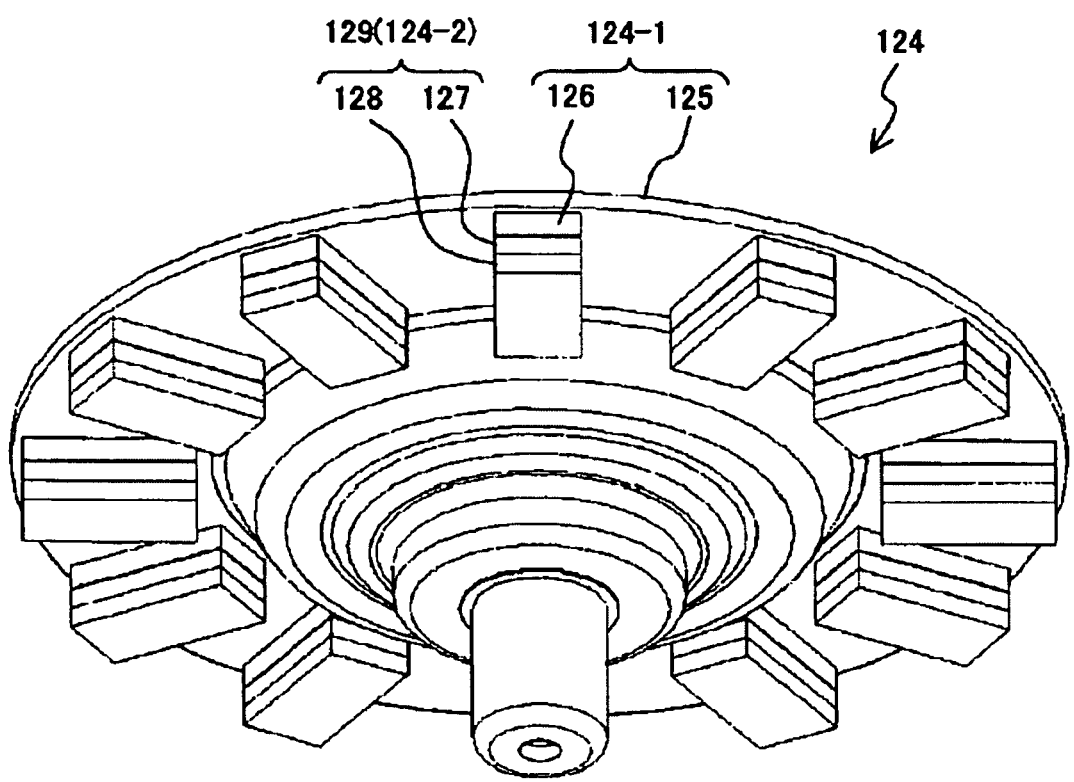
FIG. 23 is a perspective bottom view of a structure of the major part of the axial gap type electric motor according to a sixth embodiment.

In other words, by suitably positioning the first rotor section and the second rotor section to control the displacement of the rotational phase from the state shown in FIG. 22 to the state shown in FIG. 23, an amount of the flux linkage is controlled. The relationship between the rotational speed and the rotational torque thus can be controlled without wastefully using the electric power.

Structure of an Axial Gap Type Electric Motor According to a Sixth Embodiment

FIG. 23 is an illustration, showing a structure of the major part of the axial gap type electric motor according to a sixth embodiment.

This illustration only shows a rotor of the axial gap type electric motor of this embodiment.

As shown in FIG. 23, first, the rotor 124 of this embodiment includes a plurality of magnet members 126 fixedly positioned on an annular section 125 of a rotor yoke of a first rotor section 124-1.

Next, the rotor 120 includes a second rotor section 124-2 constructed in such a manner that magnetic-member-combined type magnets 129, which number is the same as the number of the magnetic members 126, are disposed on a rotary retainer (not shown) to nearly slidably contact with a rotational surface of each magnetic member 126, and the second rotor section 124-2 coaxially engages with the first rotor section 124-1 and rotates together with the first rotor section 124-1.

Each magnetic-member-combined type magnet 129 is formed in such a manner that a magnetic member 127 disposed to oppose to the respective magnetic member 126 and a field magnet 128 disposed to oppose to the stator (not shown) are stacked with each other.

A stator that is positioned to oppose to the rotor 124 has the same structure as that of the stator 39 shown in FIGS. 3 and 4.

In this axial gap type electric motor of this embodiment, when it makes a low speed high torque rotation, as shown in FIG. 23, the first rotor section 124-1 and the second rotor section 124-2 are positioned in such a manner that the respective magnetic members 126 and the magnetic-member-combined type magnets 129 entirely overlap with each other to rotate in phase.

Thereby, the magnetic fluxes coming from one magnetic pole of each field magnet 128 are gathered and the flow thereof is adjusted by the combined type magnetic member 127 and the magnetic member 126 positioned thereabove and opposing to the combined type magnetic member 127. The magnetic fluxes are then again gathered and the flow thereof is again adjusted by the annular section 125, the neighboring magnetic member 126 and the magnetic member 127 positioned opposite and below the magnetic member 126. Afterwards, the magnetic fluxes flow through the magnetic member 127 and the combined type field magnet 128.

The magnetic fluxes coming from the other magnetic pole of each field magnet 128 flow into each tooth of the stator opposing to the field magnet 128 positioned therebelow, and flow through the neighboring tooth via the stator side yoke.

That is, the magnetic fluxes of each field magnet 128 flow through the respective combined magnetic member 127 and magnetic member 126, the annular section 125, the neighboring magnetic member 126, the magnetic member 127 opposing to the magnetic member 126, the combined type field magnet 128 combined with the magnetic member 127, the tooth of the stator, the stator side yoke, the adjacent tooth, and the combined type field magnet 128 opposing the adjacent tooth to reflux through the coil wound around the tooth of the stator.

This condition is the same as the condition of the flow of the magnetic flux flow shown in FIG. 13(a). Thereby, the drive condition during the low speed high torque rotation is made can be realized.

Figure 24:
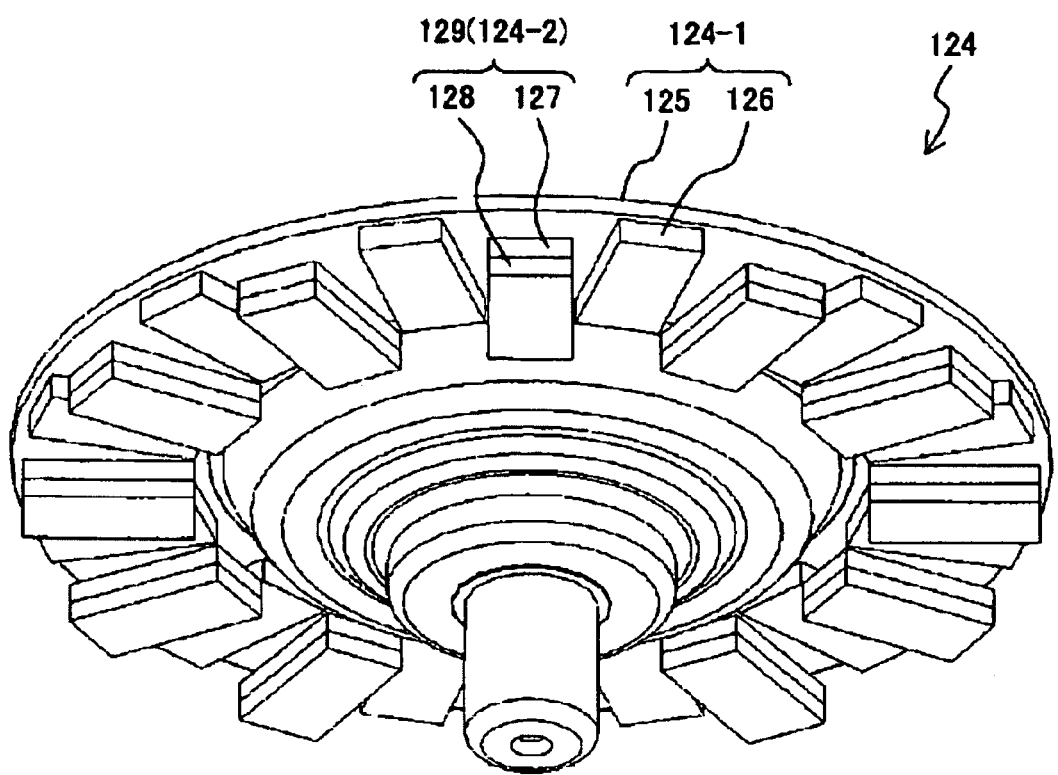
FIG. 24 is a perspective bottom view showing a relationship of displacement of the rotational phase between the first rotor section and the second rotor section when the rotor makes a high speed low torque rotation in the structure of the axial gap type electric motor according to the sixth embodiment.

FIG. 24 is an illustration, showing a relationship of displacement of the rotational phase between the first rotor section 124-1 and the second rotor section 124-2 when the rotor 120 makes a high speed low torque rotation in the structure. FIG. 24 shows a condition under which the displacement of the rotational phase between the first rotor section 120-4 and the second rotor section 120-4 is the maximum.

In this embodiment, the first rotor section 124-1 and the second rotor section 124-2 can move relative to each other between the condition under which the phases are consistent with one another as shown in FIG. 23 and the condition under which the phases are displaced within 15 degrees from one another as shown in FIG. 24.

Under the condition that the phases are displaced with 15 degrees as shown in FIG. 24, a magnetic gap between each magnetic member 127 and the respective magnetic member 126 is extremely large. Thus, almost the magnetic flux flow of each magnetic member 127 does not flow into the magnetic member 126, i.e., the magnetic flux flow is under the shut out condition.

This condition is slightly different from the condition shown in FIG. 13(b); however, the condition under which the gap becomes larger at a portion where the magnetic flux flow has been gathered and adjusted before, and the magnetic flux is shut out not to flow through the tooth of the stator side yoke is the same as the condition of FIG. 13(b). Thereby, the drive condition during the high speed low torque rotation is made can be realized.

In other words, by suitably positioning the first rotor section 124-1 and the second rotor section 124-2 to control the displacement of the rotational phase from the state shown in FIG. 23 to the state shown in FIG. 24, an amount of the flux linkage is controlled. The relationship between the rotational speed and the rotational torque thus can be controlled without wastefully using the electric power.

According to the present invention, a robust and small rotary electrical machine can be advantageously provided which has a mechanism capable of varying an output characteristic without enlargement of the whole machine configuration, without increase of mechanical loss, without any transmission, and without consumption of electric power that does not contribute to increasing torque.

Although this invention has been disclosed in the context of a certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combine with or substituted for one another in order to form varying modes of the disclosed invention. Thus, it is intended that the scope of the present invention herein disclosed should not be limited by the particular disclosed embodiments described above, but should be determined only by a fair reading of the claims.

What is claimed is:

1. A rotary electrical machine comprising:
   a rotor rotational about an axis of a rotating shaft in a first rotational direction; and
   a stator disposed so as to oppose to the rotor,
   wherein one of the rotor and the stator is divided into at least two portions in the axial direction, a first portion of the at least two portions being movable at least in a rotational direction or a reverse rotational direction of the first rotational direction relative to a second of the at least two portions in such a manner that a gap between the first portion and the second portion forms a magnetic resistance that is variable,
   the first portion being a first stator core having a first set of teeth, each tooth of the first set of teeth having an end surface opposite the rotor and a second end surface facing away from the end surface, each tooth of the first set of teeth having a winding wound around a circumferential side surface thereof, and
   the second portion being a second stator core having a second set of teeth, the second set of teeth having end portions facing the second end surfaces of the first set of teeth.

2. The rotary electrical machine recited in claim 1, wherein the movement of the first portion relative to the second portion is a reciprocal movement within a predetermined angle.

3. The rotary electrical machine recited in claim 1, wherein a rotational angle of the first portion relative to the second portion is less than a pitch angle that is defined by two adjacent teeth of the second set of teeth.

4. The rotary electrical machine recited in claim 1, wherein the first portion and the second portion are rotors,
   the first portion being a first rotor section having a first set of magnetic members, each magnetic member of the first set of magnetic members having an end surface that opposes the stator and a second end surfaces that faces away from the end surface, and
   the second portion being a second rotor section having a second set of magnetic members with end portions disposed opposite the second end surfaces of the first set of magnetic members.

5. The rotary electrical machine recited in claim 4, wherein a rotational angle of the first portion relative to the second portion is less than a pitch angle defined by two adjacent magnetic members of the second set of magnetic members.

6. A rotary electrical machine comprising:
   a rotor having an annular section rotational in a first direction about an axis of a rotating shaft;
   a first stator core having a first set of teeth, each tooth of the first set of teeth having a portion with one end surface positioned opposite the annular section and a second end surface facing in a direction generally opposite the one end surface, each tooth of the first set of teeth having a winding wound around a circumferential side surface of said portion; and
   a second stator core having a second set of teeth, the second set of teeth having end portions positioned opposite the respective second end surfaces of the first set of teeth of the first stator core, the rotor, first stator core and second stator core positioned axially along the axis of the rotating shaft and proximate each other such that at least a portion of each tooth of the first set of teeth is positionable axially opposite the annular section of the rotor and axially opposite at least one tooth of the second set of teeth of the second stator core,
   wherein the second stator core is movable at least in the first direction or in a reverse rotational direction.

7. The rotary electrical machine recited in claim 6, wherein the second stator core is movable in the first direction or the reverse rotational direction of the rotor and also movable in an axial direction of the rotor.

8. The rotary electrical machine recited in claim 6, wherein each tooth of the first set of teeth has a protruding portion at the second end surface thereof configured to abut a side surface of each tooth of the second set of teeth.

9. The rotary electrical machine recited in claim 6, wherein each tooth of the first set of teeth is divided into a first portion which has a winding on a circumferential surface thereof and a second portion which has no winding on a circumferential surface thereof, and the second set of teeth include teeth corresponding to the first portion of each tooth of the first set of teeth, and other teeth corresponding to the second portion of each tooth of the first set of teeth.

10. The rotary electrical machine recited in claim 6, wherein respective opposing surfaces of the rotor and the first set of teeth are formed to obliquely extend in such a manner that an inner side of the opposing surface of the rotor that is positioned radially closer to the axis of a rotating shaft is thicker than an outer side thereof.

11. The rotary electrical machine recited in claim 6, wherein, when the second set of teeth are positioned directly opposite the first set of teeth, a magnetic resistance between one tooth of the first set of teeth and one tooth of the directly opposing second set of teeth is smaller than a magnetic resistance between adjacent teeth of the first set of teeth, and, when the second set of teeth move so that the one tooth of the second set of teeth is placed at a position between adjacent teeth of the first set of teeth, a magnetic resistance between one tooth of the second set of teeth and the adjacent teeth of the first set of teeth is larger than a magnetic resistance between the adjacent teeth of the first set of teeth.

12. The rotary electrical machine recited in claim 11, wherein the magnetic resistances are adjustable by a distance between the adjacent teeth of the first set of teeth, or a distance between the one tooth of the first set of teeth and the one tooth of the second set of teeth.

13. The rotary electrical machine recited in claim 6, further comprising a movement drive force transmitting mechanism for moving the second stator core in the first direction or in the reverse rotational direction.

14. The rotary electrical machine recited in claim 6, wherein the movement of the second stator core relative to the first stator core is a reciprocal movement within a predetermined angle in the first direction or in the reverse rotational direction.

15. The rotary electrical machine recited in claim 6, wherein the movement of the second stator core relative to the first stator core is an intermittently rotational movement in the first direction.

16. The rotary electrical machine recited in claim 6, wherein the first set of teeth and the windings are unitarily molded together.

17. The rotary electrical machine recited in claim 6, wherein the second set of teeth and the windings are unitarily molded together.

18. A rotary electrical machine comprising:
a rotor having an annular section rotational in a first direction about an axis of a rotating shaft;
a first stator core having a first set of teeth, each tooth of the first set of teeth having a portion with one end surface positionable opposite the annular section and a second end surface facing in a direction generally opposite the one end surface, each tooth of the first set of teeth having a winding wound around a circumferential side surface of said portion; and
a second stator core having a second set of teeth, the second set of teeth having end portions positionable opposite the respective second end surfaces of the first set of teeth of the first stator core,
wherein the second stator core is movable at least in the first direction or in a reverse rotational direction, and wherein the second stator core is also movable in an axial direction of the rotor.

19. A rotary electrical machine comprising:
a rotor having an annular section rotational in a first direction about an axis of a rotating shaft;
a first stator core having a first set of teeth, each tooth of the first set of teeth having a portion with one end surface positionable opposite the annular section and a second end surface facing in a direction generally opposite the one end surface, each tooth of the first set of teeth having a winding wound around a circumferential side surface of said portion; and
a second stator core having a second set of teeth, the second set of teeth having end portions positionable opposite the respective second end surfaces of the first set of teeth of the first stator core, each tooth of the first set of teeth has a protruding portion at the second end surface thereof configured to abut a side surface of each tooth of the second set of teeth,
wherein the second stator core is movable at least in the first direction or in a reverse rotational direction.

* * * * *